(12) United States Patent
Niebauer

(10) Patent No.: US 9,291,742 B2
(45) Date of Patent: Mar. 22, 2016

(54) DOUBLE PENDULUM GRAVIMETER AND METHOD OF MEASURING GRAVITY USING THE SAME

(71) Applicant: Micro-g LaCoste, Inc., Lafayette, CO (US)

(72) Inventor: Timothy M. Niebauer, Boulder, CO (US)

(73) Assignee: Micro-g LaCoste, Inc., Lafayette, CO (US)

(*) Notice: Subject to any disclaimer, the term of this patent is extended or adjusted under 35 U.S.C. 154(b) by 158 days.

(21) Appl. No.: 14/182,091

(22) Filed: Feb. 17, 2014

(65) Prior Publication Data
US 2015/0234087 A1 Aug. 20, 2015

(51) Int. Cl.
*G01V 7/12* (2006.01)
*G04B 17/02* (2006.01)

(52) U.S. Cl.
CPC . *G01V 7/12* (2013.01); *G04B 17/02* (2013.01); *G04B 17/025* (2013.01)

(58) Field of Classification Search
CPC .................................. G01V 7/12; G01B 17/02
USPC ........................................................ 73/382 R
See application file for complete search history.

(56) References Cited

U.S. PATENT DOCUMENTS

| | | | | |
|---|---|---|---|---|
| 1,787,536 A * | 1/1931 | Hayes | G01V 7/12 250/231.1 |
| 1,858,384 A * | 5/1932 | Andre | G01V 7/12 33/309 |
| 2,000,948 A * | 5/1935 | Hayes | G01V 7/12 250/232 |
| 2,732,717 A * | 1/1956 | Rothacker | G01V 7/12 73/382 R |
| 3,173,297 A * | 3/1965 | Thompson | G01V 7/12 73/382 R |
| 3,357,253 A * | 12/1967 | Saxl | G01V 7/12 73/382 R |
| 3,473,229 A * | 10/1969 | Moscovich | G09B 23/10 33/27.11 |
| 3,496,641 A * | 2/1970 | Mills | B43L 11/005 33/27.11 |
| 3,722,286 A * | 3/1973 | Weber | G01V 7/005 73/382 R |
| 3,903,684 A * | 9/1975 | Wilson | G04F 1/00 273/148 R |
| 3,926,054 A * | 12/1975 | Buck | G01V 7/12 73/382 R |
| 3,960,344 A * | 6/1976 | Dugan | G01V 7/16 244/177 |
| 3,977,085 A * | 8/1976 | Sandifer | B43L 11/005 33/27.11 |
| 4,318,297 A * | 3/1982 | Zaffran | G01N 3/50 73/78 |

(Continued)

OTHER PUBLICATIONS

Baker, Gregory L., and Blackburn, James A.. Pendulum : A Case Study in Physics. Oxford, GBR: Oxford University Press, 2005. ProQuest ebrary. Web. Sep. 17, 2015.*

(Continued)

*Primary Examiner* — Lisa Caputo
*Assistant Examiner* — Tran M Tran
(74) *Attorney, Agent, or Firm* — John R. Ley

(57) ABSTRACT

A double pendulum gravimeter accurately measures gravity by transferring aligned mode energy between suspension points of the pendulums to establish equal arcs of oscillation of the pendulums and by sensing oscillation characteristics to establish an accurate gravity value including a correction factor which depends on the arc of oscillation, while absorbing adverse mode energy.

35 Claims, 15 Drawing Sheets

(56) References Cited

U.S. PATENT DOCUMENTS

| | | | | |
|---|---|---|---|---|
| 4,457,168 A * | 7/1984 | Lautzenhiser | ............ | G01V 7/04 73/382 R |
| 4,601,200 A * | 7/1986 | Stoffelen | ................. | G01D 5/08 374/142 |
| 4,703,562 A * | 11/1987 | Burkholder | ............ | B43L 11/005 33/27.11 |
| 4,945,347 A * | 7/1990 | Perry | ..................... | G01V 1/008 200/61.45 R |
| 5,204,568 A * | 4/1993 | Kleinberg | ............ | F16C 32/0438 310/90.5 |
| 5,457,993 A * | 10/1995 | Sapuppo | ................. | G01C 19/42 73/504.02 |
| 5,892,151 A * | 4/1999 | Niebauer | ................. | G01V 7/14 73/382 R |
| 7,354,352 B2 * | 4/2008 | Keska | ................. | A47D 13/105 472/119 |
| 7,406,390 B2 * | 7/2008 | Niebauer | ............... | G01V 13/00 702/85 |
| 7,469,585 B2 * | 12/2008 | Meyer | ..................... | G01V 7/00 73/382 G |
| 7,959,514 B2 * | 6/2011 | Chen | .................... | A47D 13/105 472/119 |
| 8,442,777 B1 * | 5/2013 | Mekid | ..................... | G01N 3/56 702/33 |
| 2004/0250614 A1 * | 12/2004 | Ander | ..................... | G01V 7/00 73/152.05 |
| 2008/0295594 A1 * | 12/2008 | Aliod | ...................... | G01V 7/12 73/382 R |
| 2011/0296914 A1 * | 12/2011 | Takahashi | .......... | G01C 19/5726 73/504.15 |
| 2012/0312097 A1 * | 12/2012 | Koyama | ................ | G01P 15/125 73/514.34 |
| 2013/0036801 A1 * | 2/2013 | Bingham | ................ | G01M 1/10 73/65.08 |
| 2015/0234088 A1 * | 8/2015 | Rohner | ..................... | G01V 7/12 248/610 |

OTHER PUBLICATIONS

William F. Hoffmann, "A Pendulum Gravimeter for Measurement of Periodic Annual Variations in the Gravitational Constant," Thesis, Jan. 1962, 124 pages, Palmer Physical Laboratory, Princeton University, Princeton, New Jersey.

David R. Curott, "A Pendulum Gravimeter for Precision Detection of Scalar Gravitational Radiation," Thesis, May 1965, 122 pages, Palmer Physical Laboratory, Princeton University, Princeton, New Jersey.

* cited by examiner

DOUBLE PENDULUM GRAVIMETER AND METHOD OF MEASURING GRAVITY USING THE SAME

CROSS-REFERENCE TO RELATED INVENTION

This invention is related to an invention described in U.S. patent application Ser. No. 14/182,168, for a Pendulum Arm Flexure and Method of Construction, which is filed concurrently herewith and assigned to the assignee of the present invention. The subject matter of this concurrently filed application is incorporated herein by this reference.

FIELD OF THE INVENTION

This invention relates to the measurement of gravity, and more particularly to a new and improved pendulum gravimeter and method of gravity measurement which quickly damps or eliminates the adverse influences of unwanted modes of motion due to spurious energy effects, including seismic noise, and which maintains a constant amplitude of oscillation of the pendulum in an arc of oscillation, to enable gravity measurements that are accurate to at least nine digits ($10^{-9}$).

BACKGROUND OF THE INVENTION

Gravity is the force of inherent natural attraction between two massive bodies. The magnitude of the gravitational force is directly related to the mass of the bodies and is inversely related to the square of the distance between centers of mass of the two attracted bodies.

Gravity is measured as acceleration, g, usually as a vertical vector component. The freefall acceleration, g, of an object near the surface of the earth is given to a first approximation by the gravitational attraction of a point with the mass of the entire earth, $M_e$, located at the center of the earth, a distance, $R_e$, from the surface of the earth. This nominal gravity value, $g=G \times M_e/R_e^2$, is about 9.8 m/s². The nominal gravity value varies over the earth's surface in a relatively small range of about 0.5%. At the equator, the nominal gravity value is about 9.780 m/s², and at the north and south poles, the nominal gravity value is about 9.830 m/s². The common unit of measurement for gravity is the "Galileo" (Gal), which is a unit of acceleration defined as 1 cm/s². One Gal generally approximates 1/1000 ($10^{-3}$) of the force of gravity at the earth's surface. An instrument used to measure gravity is called a "gravimeter."

Gravity measurements are used in a number of practical applications, such as mapping subsurface geology, exploration and development of mineral and hydrocarbon resources, volcanology, geotechnical investigations and the environment. Subsurface gravity measurements are typically made by lowering a gravimeter in a borehole or well bore, and measuring gravity at intervals along the depth of an area of interest. With sufficiently accurate gravity measurements at multiple intervals, the mean bulk density of the formation of interest can be determined. Mean bulk density information is particularly useful to monitor the change in condition of hydrocarbon reservoirs which contain crude oil or natural gas. The mean bulk density information indicates the extent to which the crude oil or natural gas has flowed from or changed in position within the formation. This information is useful to optimize the efficiency of extraction of these hydrocarbon resources.

To be the most effective in determining mean bulk density, the gravity measurements should have accuracy to at least nine digits ($10^{-9}$). Measurements of lesser accuracy may not be adequate to obtain a meaningful evaluation of mean bulk density. In addition, the gravimeter itself must have a physical size which allows it to be inserted into and moved along a borehole. A diameter of a borehole in which gravity measurements are taken may be as small as 2⅜ inches, although the borehole of a producing well in which gravity measurements are also taken is typically larger.

At the present time, a differential interferometric gravimeter has the capability of gravity measurement accuracy to at least nine digits. An example of this type of gravimeter is described in U.S. Pat. No. 5,892,151, invented by the inventor hereof. In general, a differential interferometric gravimeter uses at least one test mass which is released to fall freely under the influence of gravity within a vacuum chamber, while a laser beam impinges upon and reflects in at least two separate beams from the freely falling test mass. The two beams are combined, and phase differences in the two combined light beams create interference fringes. The interference fringes correlate to the gravity value. This type of differential interferometric gravimeter involves complex and sensitive equipment, and is prone to adverse influences from environmental perturbations. In addition, the physical size of the equipment is considerably larger than the size of a typical borehole. For these and other reasons, a differential interferometric gravimeter is not suitable for measuring gravity in small diameter boreholes.

Another type of gravimeter is a relative gravimeter. In general, a relative gravimeter suspends a test mass from a spring or other type of suspension device, and then measures the extent to which the change in gravity alters the extent of elongation of the spring or suspension device. While relative gravimeters are small in size and capable of fitting within a typical borehole, the accuracy of measurement is not remotely close to nine digit accuracy.

Another type of gravimeter utilizes a pendulum to measure gravity. A mass or "bob" is suspended by an arm that is connected to a point of suspension or center of motion. Energy imparted to the bob causes it to swing back and forth in an arc of oscillation. Gravity sustains the oscillation of the bob until the inherent friction of mechanical movement dissipates the energy initially imparted to move the bob.

The time required for the pendulum bob to execute one oscillation or swing from one point in the arc of oscillation back to that same point is the period (T) of oscillation. The period (T) of oscillation, the value of gravity (g) and the length of the pendulum arm (L) are related to one another by the following well-known equation (1):

$$T = 2\pi [L/g]^{1/2} \tag{1}$$

From equation (1), it is apparent that the value of gravity is related to the length of the pendulum arm (L) and inversely related to the period (T) of oscillation. By measuring the length of the pendulum arm (L) and by measuring the period (T) of oscillation, the value of gravity is determined by the following equation (2), which is a rearranged version of equation (1):

$$g = 4\pi^2 L/T^2 \tag{2}$$

Alternatively, since the frequency (f) of oscillatory movement is the inverse of the period of oscillatory movement, the frequency (f) of oscillation of the bob is equal to 1/T. Applying this to equation (2) shows that the value of gravity is also related to the frequency (f) of the pendulum oscillation by the following equation (3):

$$g = 4\pi^2 L f^2 \tag{3}$$

Because there are no theoretical limits on the length (L) of the pendulum arm or on the period (T) or the frequency (f) of the oscillatory movement, the pendulum itself can be made sufficiently small so that it can be inserted within a typical borehole and be used to measure gravity values at intervals within the borehole. Although the pendulum solves the size problems for gravity measurement in small diameter boreholes, certain other practical problems arise. These problems center around the practical recognition that actual performance of a pendulum departs from the ideal or theoretical behavior defined by equations (1)-(3) and also around the practical difficulty of operating the pendulum in an outside environment as compared to a closely controlled laboratory environment.

Equations (1)-(3) do not predict the ideal behavior of a pendulum when the arc of oscillation departs from an infinitesimally small angle. A practical and workable pendulum must have an arc of oscillation which is greater than an infinitesimally small angle, and in which case, the period (T) or the frequency (f) becomes dependent upon the arc of oscillation. The arc of oscillation is also related to the maximum amplitude points of the bob during oscillation. A greater arc of oscillation results in greater maximum amplitude points. The maximum amplitude points are measured transversely from to a vertical reference through the point of suspension.

A mathematical correction factor can be applied to correct the period (T) or frequency (f) based on the arc of oscillation or the maximum amplitude points during oscillation, when those values are greater than an infinitesimal value. This mathematical correction factor is a complicated expansion of a elliptical integral in a power series, and is described in "The Earth and Its Gravity Field," by Heiskanen and Meines, McGraw-Hill, 1958, pp. 87-93. The necessity to calculate and apply a mathematical correction factor complicates the gravity measurement.

Another practical difficulty is that the pendulum will not continue to oscillate indefinitely, due to the loss of oscillation energy caused by frictional movement of the swinging pendulum. The loss of energy has the practical effect of continually decreasing the arc of oscillation and the maximum amplitude points. It is more difficult to measure the arc of oscillation and the maximum amplitude points of oscillation under the circumstances of decreasing or decaying oscillation of the pendulum. Without an accurate measurement of these values, an accurate determination of the value of gravity is not possible.

It is possible to calculate a gravity value while the pendulum is undergoing a decay in the angle of oscillation due to energy loss. However, since the correction factor depends on the angle of oscillation, the correction factor must be recalculated and reapplied continuously as the arc of oscillation and the maximum amplitude points decrease during decaying oscillation. The calculations must be continually coordinated with measurements of the period (T) or frequency (f), as the oscillation of the pendulum decays. Considerable computation is required to derive a gravity value under these circumstances, and even then, the accuracy may be compromised due to the difficulty in measuring the continually changing values required to derive an accurate gravity value determination.

It theoretically possible to add energy to the pendulum to counteract the frictional energy loss and thereby establish and maintain a constant arc of oscillation with constant maximum amplitude points of oscillation. However, adding energy to the pendulum substantially increases the risk of disturbing the normal oscillatory motion and creating unwanted modes of motion by the pendulum bob. Unwanted modes of motion and the energy which creates those unwanted modes of motion adversely influence oscillation and cause the pendulum to depart from a desired plane of oscillation. The oscillatory movement outside of the desired plane of oscillation does not accurately represent the effect of gravity in the measured plane of oscillation, thereby introducing errors in the gravity values determined.

To avoid the disruptive effects of adding energy to an oscillating pendulum, a finite amount of energy may be added to the pendulum followed by an interval where any disruptive effects of the added energy are expected to dissipate. Theoretically, a sufficient amount of energy can be added so that the disruptive effects of the energy addition will have dissipated when the oscillation motion decays through a preselected maximum amplitude point and arc of oscillation. While this approach of adding energy does have the theoretical effect of more closely achieving a predetermined arc of oscillation and points of maximum amplitude where instantaneous measurements can be taken, the approach involves risks of inaccuracy in measurement of the values required. The time required to accomplish sequential gravity value measurements is also extended due to the necessity to allow the disruptive effects of the energy addition to dissipate.

Seismic noise is particularly troublesome problem in attempting to make accurate gravity measurements using a pendulum gravimeter. Seismic noise is a naturally occurring phenomenon resulting from natural movement of the earth itself and its subsurface formations. Seismic noise occurs continuously and has random, unpredictable intensity. The magnitude of normal seismic noise is so small that it is not humanly perceptible. However, the magnitude of normal seismic noise is sufficient to adversely affect the arc of oscillation and maximum amplitude points of a pendulum, making the measurement of gravity (g) with the accuracy of nine digits ($10^{-9}$) impossible with a single pendulum gravimeter.

SUMMARY OF THE INVENTION

A pendulum gravimeter of the present invention solves or ameliorates the above described and other problems, to obtain gravity measurements with the accuracy of nine digits ($10^{-9}$). The pendulum of the gravimeter oscillates with a constant arc of oscillation and constant maximum amplitude points. Gravity value measurements which are determined more accurately, more easily and more quickly, due to the constant amplitude and arc of oscillation of the pendulum. The necessity to measure a decreasing amplitude, a decaying arc of oscillation, and/or a changing period (T) and/or frequency (f) is eliminated, as is the necessity to continuously recalculate and reapply a complicated mathematical correction factor to obtain an accurate gravity value determination. The period (T) and/or frequency (f) of pendulum oscillation is easier to determine and measure with accuracy, because of the constant amplitude and arc of oscillation, leading to increased accuracy in the gravity measurement. While a mathematical correction factor is still required based on the amplitude and arc of pendulum oscillation, that mathematical correction is a single value which does not need to be recalculated due to the constant amplitude and arc of oscillation.

The pendulum gravimeter of the present invention also effectively dissipates and absorbs adverse mode energy that creates unwanted modes of motion of the oscillating pendulum. The desired oscillation of the pendulum is therefore not significantly and adversely influenced to a point where accuracy in the gravity measurement is substantially compromised.

The adverse effects of seismic noise are eliminated by using a gravimeter having two pendulums oscillating in a 180° phase relationship with one another. Desirable mode energy is transferred between the two pendulums, while undesirable mode energy is quickly absorbed and dissipated. Averaging representations of the separate oscillation characteristics of the two pendulums cancels the adverse influences from seismic noise.

The physical size of the pendulum gravimeter with these and other beneficial features permits it to be incorporated within an instrument that permits it to be inserted into and moved along a typical diameter borehole to obtain gravity measurements. Accurate measurements of gravity to nine digits are readily obtained within the borehole.

These and other benefits and improvements of the invention are achieved, in one fundamental regard, by a double pendulum gravimeter. A first pendulum is connected at a first suspension point to oscillate in a first arc of oscillation under the influence of gravity and oscillation energy applied to the first pendulum. A first sensor is associated with the first pendulum to sense a characteristic of oscillation in the first arc of oscillation. A second pendulum is connected at a second suspension point to oscillate in a second arc of oscillation under the influence of gravity and oscillation energy applied to the second pendulum. A second sensor is associated with the second pendulum to sense a characteristic of oscillation in the second arc of oscillation. The first and second suspension points are separated from one another. The first and second pendulums oscillate in a common plane at a relative 180° phase difference with respect to one another. A transfer coupling is connected to the first and second suspension points and is operative to transfer desirable aligned mode energy between the first and second suspension points. The aligned mode energy constitutes any component of energy within the common plane which is aligned directly between the first and second suspension points and which is effective at the first and second suspension points. Transferring the aligned mode energy facilitates achieving the described improvements.

In other regards, the aligned mode energy includes a component of energy that is related to any difference in oscillation energy of the first and second pendulums, and the transfer coupling transfers any difference in oscillation energy of the first and second pendulums as aligned mode energy between the first and second pendulums. The transfer coupling transfers the aligned mode energy between the first and second suspension points until the first and second pendulums have approximately equal oscillation energy. The approximately equal oscillation energy correlates to an angle of the arc of oscillation of each pendulum, and that angle is used to determine a correction factor that is used to determine the value of gravity.

An absorbing coupling is connected to the first and second suspension points to dissipate undesirable perpendicular mode energy from the first and second suspension points. The perpendicular mode energy constitutes any component of energy which is effective perpendicular to the aligned mode energy transferred by the transfer coupling between the first and second suspension points. Absorbing the perpendicular mode energy facilitates achieving the described improvements of the present invention.

A computational device may be combined with the gravimeter. The computational device receives the information from the first and second sensors, utilizes the information describing the sensed characteristics from the first and second sensors to establish a separate representation of the oscillation of each of the first and second pendulums. The separate representations of the oscillation of the first and second pendulums are averaged when determining the value of gravity. Averaging the separate representations of eliminates the adverse effects of seismic noise.

The benefits and improvements of the invention are also achieved in another fundamental regard by a gravimeter which comprises a pendulum connected at a suspension point to oscillate about the suspension point in an arc of oscillation under the influence of gravity and oscillation energy applied to the pendulum. A sensor is associated with the pendulum to sense a characteristic of oscillation in the arc of oscillation. An energy control motor is connected to move the suspension point. An energy feedback controller actuates the energy control motor to move the suspension point during oscillation of the pendulum and thereby change the amount of oscillation energy of the pendulum to establish and maintain a substantially constant arc of oscillation of the pendulum. The sensed characteristic includes information sufficient to calculate the value of gravity based on the substantially constant arc of oscillation of the pendulum.

The energy control motor moves the suspension point in the direction of pendulum movement to add oscillation energy to the pendulum and moves the suspension point in a direction opposite of pendulum movement subtract oscillation energy from the pendulum. The energy control motor moves the suspension point perpendicularly within the plane of oscillation relative to a vertical reference through the suspension point to add or subtract the oscillation energy.

In another fundamental regard, the invention involves a method of measuring a value of gravity which comprises oscillating a first pendulum about a first suspension point in a first arc of oscillation under the influence of gravity and oscillation energy applied to the first pendulum, oscillating a second pendulum about a second suspension point in a second arc of oscillation under the influence of gravity and oscillation energy applied to the second pendulum, oscillating the first and second pendulums at a relative 180° phase difference with respect to one another in a common plane, transferring desirable aligned mode energy between the first and second suspension points, and determining the value of gravity from a characteristic of oscillation of one of the first or second pendulums. The aligned mode energy constitutes any component of energy within the common plane which is aligned directly between the first and second suspension points and which is effective at the first and second suspension points.

The aligned mode energy includes a component of energy that is related to any difference in oscillation energy of the first and second pendulums. The aligned mode energy is transferred between the first and second suspension points until the first and second pendulums have equal oscillation energy. The suspension point of one of the first or second pendulums is moved during oscillation to thereby change the amount of oscillation energy of both pendulums and to establish and maintain a substantially constant arc of oscillation of both pendulums.

Undesirable perpendicular mode energy from the first and second suspension points is absorbed and dissipated. The perpendicular mode energy constitutes any component of energy which is effective perpendicular to the aligned mode energy transferred between the first and second suspension points. Separate representations of the oscillation characteristics of each of the first and second pendulums are established, and those separate representations are averaged when determining the value of gravity.

In another fundamental regard, the invention involves a method for measuring a value of gravity which comprises oscillating a pendulum about a suspension point in an arc of oscillation under the influence of gravity and oscillation energy applied to the pendulum, sensing a characteristic of oscillation of the pendulum in the arc of oscillation, moving the suspension point during oscillation of the pendulum in relation to the sensed characteristic to thereby change the amount of oscillation energy of the pendulum to establish and maintain a substantially constant arc of oscillation of the pendulum, and determining the value of gravity based on the substantially constant arc of oscillation of the pendulum.

The suspension point is moved in the direction of pendulum movement to add oscillation energy to the pendulum and is moved in a direction opposite of pendulum movement to subtract oscillation energy from the pendulum.

A more complete appreciation of the present invention and its scope may be obtained from the accompanying drawings, which are briefly summarized below, from the following detailed description of presently preferred embodiments of the invention, and from the appended claims.

DETAILED DESCRIPTION

Figure 1:
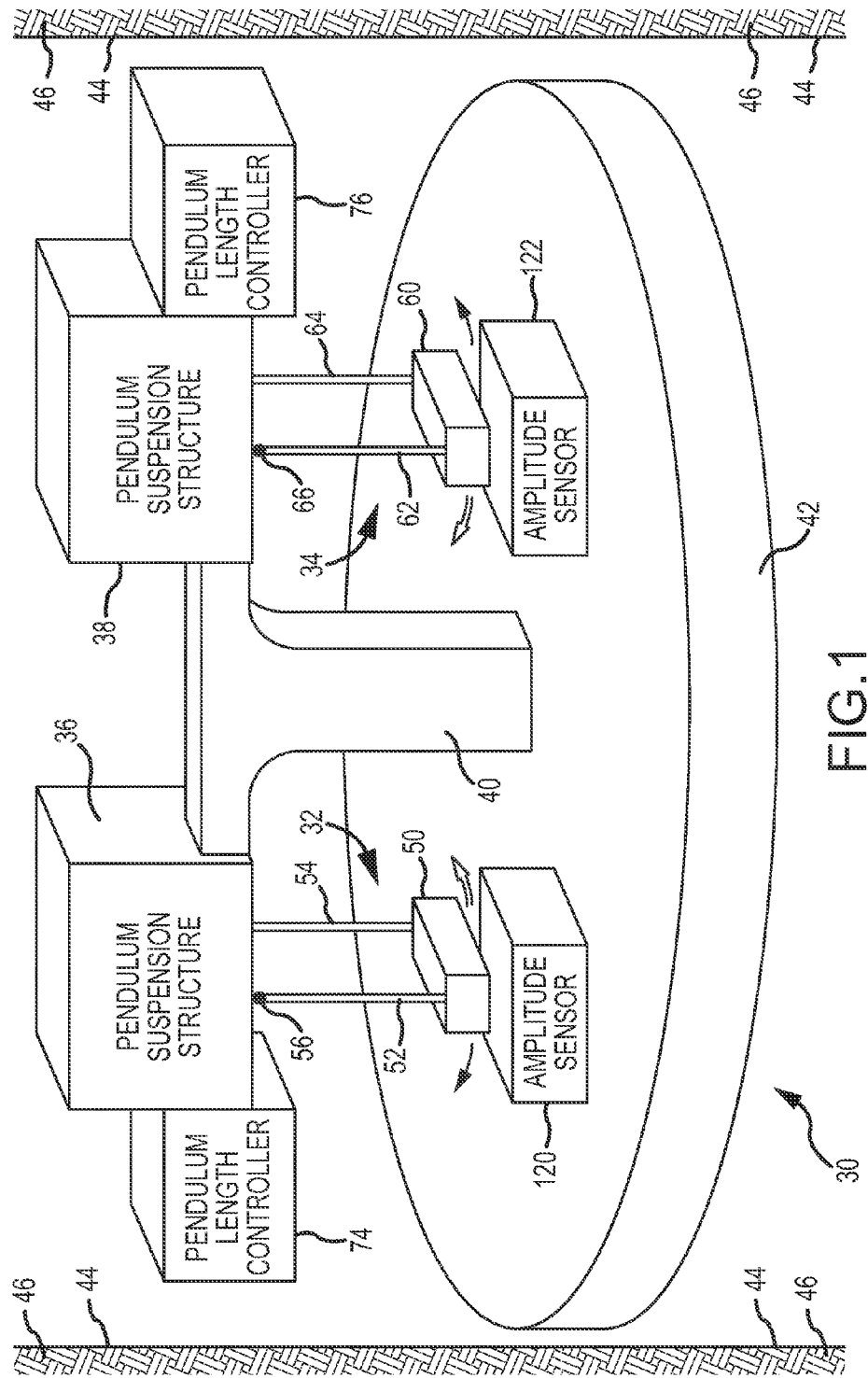
FIG. 1 is a block diagram and perspective generalized component illustration of a double pendulum gravimeter which incorporates the present invention.

Basic features of a double pendulum gravimeter 30 are shown generally in FIG. 1. The gravimeter 30 includes a first pendulum 32 and a second pendulum 34, both of which are suspended or supported to swing or oscillate by pendulum suspension structures 36 and 38, respectively. Both pendulum suspension structures 36 and 38 are connected to a support post 40 which rigidly attaches to or is an integral part of a rigid base 42 of the gravimeter 30. The gravimeter 30 is enclosed within a sealed vessel (not shown). The sealed vessel has a size or diameter which permits the gravimeter 30 to be inserted into a borehole 44 formed into an earth formation 46.

Figure 2:
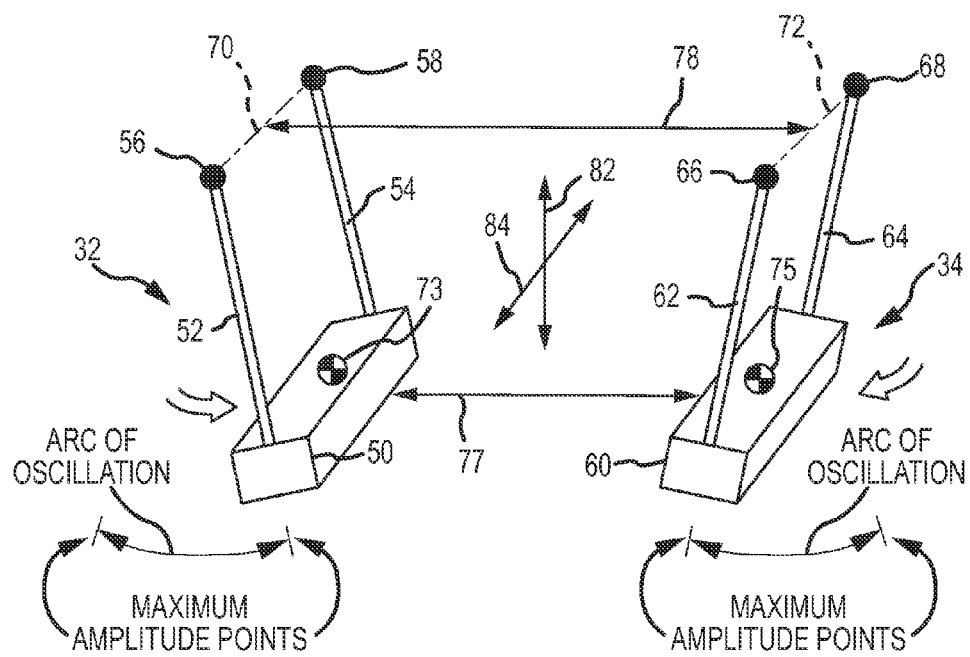
FIG. 2 is an illustration of the movement of the two pendulums of the gravimeter shown in FIG. 1 within a common plane of oscillation, at corresponding maximum points of amplitude in their respective arcs of oscillation.
Figure 3:
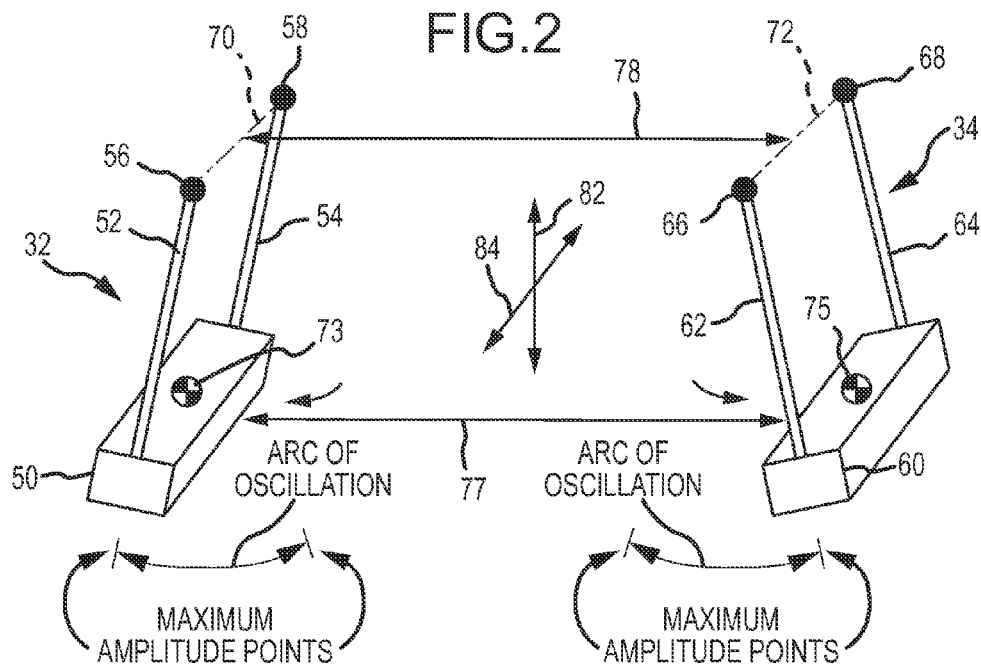
FIG. 3 is an illustration similar to FIG. 2, showing the two pendulums at corresponding opposite maximum points of amplitude in their respective arcs oscillation within the common plane of oscillation.

The first pendulum 32 comprises a pendulum bob 50 and two pendulum arms 52 and 54, as shown in FIGS. 1, 2 and 3. The upper ends of the pendulum arms 52 and 54 are connected to the pendulum suspension structure 36 (FIG. 1) to oscillate in an arc of oscillation about points of suspension 56 and 58, respectively. The second pendulum 34 comprises a pendulum bob 60 and two pendulum arms 62 and 64. The upper ends of the pendulum arms 62 and 64 are connected to the pendulum suspension structure 38 (FIG. 1) to oscillate in an arc of oscillation about points of suspension 66 and 68, respectively.

The pendulums 32 and 34 oscillate in their arcs of oscillation because oscillation energy is initially imparted to the pendulums to cause them to swing. The effect of gravity is to conserve the initially imparted oscillation energy. Gravity causes the pendulum bobs to move in their arcs of oscillation. Gravity converts potential energy at the maximum amplitude points in each arc of oscillation into kinetic energy at the midpoint of each arc of oscillation, and then back to potential energy when the pendulum bob reaches the other maximum amplitude point. This occurs twice during each period (T) of oscillation. But for the effects of friction, the initially imparted oscillation energy would cause the pendulum to oscillate with the same arc of oscillation and the same maximum amplitude points on a perpetual basis. However, the effects of friction dissipate the initially imparted oscillation energy. As the oscillation energy diminishes over time, the arcs of oscillation and the maximum amplitude points also diminish in magnitude.

The pendulum suspension structures 36 and 38 are positioned and aligned on the support post 40 so that an imaginary line 70 between the points of suspension 56 and 58 is parallel to an imaginary line 72 between the points of suspension 66 and 68, as shown in FIGS. 2 and 3. The movement of the pendulum bob 50 in its arc of oscillation is perpendicular to the line 70, and the movement of the pendulum bob 60 in its arc of oscillation is perpendicular to the line 72. The weight and mass distribution of the pendulum bobs 50 and 60 are equal, and their center of mass or gravity points 73 and 75 move in the common plane of oscillation of the pendulums 32 and 34 represented in part by an imaginary line 77 which extends between the points 73 and 75. The common plane of oscillation of the pendulum bobs 50 and 60 is also represented by an imaginary line 78 which perpendicularly bisects the parallel lines 70 and 72 between the points of suspension 56, 58 and 66, 68.

As shown in FIG. 2, the pendulum 32 swings to the right in its arc of oscillation, and simultaneously the pendulum 34 swings to the left in its arc of oscillation. Similarly as shown in FIG. 3, the pendulum 32 swings to the left in its arc of oscillation, and simultaneously pendulum 34 swings to the right in its arc of oscillation. The pendulums 32 and 34 oscillate or swing in opposite motions relative to one another in the common plane defined by both arcs of oscillation. The opposite directions of movement oscillate the pendulums 32 and 34 with a relative phase difference of 180°. The 180° phase difference causes the pendulums 32 and 34 to reach maximum amplitude points which are closest to one another in their respective arcs of oscillation at the same time (FIG. 2) and causes the pendulums 32 and 34 to reach maximum amplitude points which are farthest from one another in their respective arcs of oscillation at the same time (FIG. 3). Using the two pendulums 32 and 34 which oscillate with a phase difference of 180° has the beneficial effect of canceling anomalous seismic noise, as explained more completely below, resulting in greater accuracy in the gravity measurement.

The length and flex characteristics of the pendulum arms 52, 54 and 62, 64 are substantially equal, as described below in conjunction with FIGS. 20 and 21 and in the above cross-referenced US patent application. To the extent that there are slight differences in the effective length (L) of one pendulum 32 or 34 compared to the other pendulum 34 or 32, or to the extent that an effective length (L) of both pendulums is selected as shorter than the actual physical length of the pendulum arms 52, 54 and 62, 64 themselves, adjustments in the effective length (L) of the pendulums 32 and 34 are accomplished by pendulum length controllers 74 and 76, respectively (FIG. 1). Details of the pendulum length controllers 74 and 76 are described below in conjunction with FIGS. 6-8.

The equal mass distribution characteristics of the bobs 50 and 60, the equal length of the pendulum arms 52, 54 and 62, 64, and the similar length and flex characteristics of the pendulum arms 52, 54 and 62, 64, collectively cause the pendulums 32 and 34 to experience essentially the same or very similar natural resonant frequency oscillation characteristics. The natural resonant frequency oscillation characteristics cause each pendulum 32 and 34 to oscillate at approximately the same natural frequency (f) or period (T).

When oscillating at their natural resonant frequencies, the pendulums 32 and 34 conserve the maximum amount of energy. Stated alternatively, the pendulums 32 and 34 minimize the loss of oscillating energy when operating at their natural resonant frequencies. The natural resonant frequency energy storage characteristic of any resonant system is referred to as the "Q" of the resonant system. When oscillating at a high Q, the resonant system conserves the maximum amount of its oscillating energy and loses the minimum amount of its oscillating energy. The pendulums 32 and 34 operate in substantially identical high Q conditions. The consequence of conserving the maximum amount of energy, or minimizing the loss of oscillating energy, is that the pendulums 32 and 34 require a minimum amount of added energy to maintain constant maximum amplitude points and constant arcs of oscillation, to counteract the unavoidable energy loss associated with any movement in a mechanical system. Disruptions caused by adding energy are thereby minimized.

To maintain both pendulums 32 and 34 oscillating at a 180° phase relationship with one another, the pendulum suspension structures 36 and 38 must transfer energy between the suspension points 56, 58 and 66, 68 of the pendulums 32 and 34. The energy transfer must occur along or parallel to the imaginary line 78 which extends perpendicularly with respect to and directly between the imaginary lines 70 and 72, as shown in FIGS. 2 and 3. The energy transferred along or parallel to the line 78 is referred to herein as aligned mode energy. The aligned mode energy is effective within the common plane of oscillation and is effective at the points of suspension 56, 58 and 66, 68. The aligned mode energy need not be applied directly along the line 78, or directly within the common plane of oscillation, or directly at the suspension points 56, 58 and 66, 68, but the aligned mode energy must have its effect on the pendulums 32 and 34 at the suspension points 56, 58 and 66, 68 along and parallel to the line 78.

Figure 4:
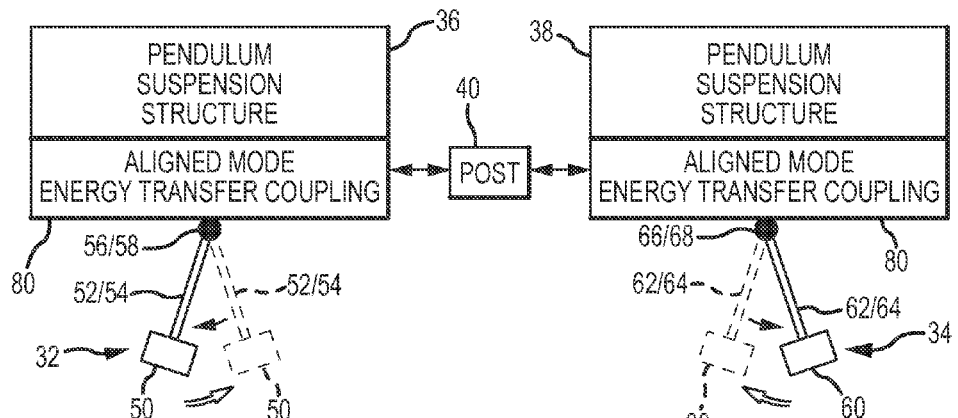
FIG. 4 is a block diagram of an aligned mode energy transfer coupling within suspension structures of the two pendulums of the gravimeter shown in FIGS. 1, 2 and 3.

An aligned energy mode transfer coupling 80 and the support post 40 (FIG. 1), transfer aligned mode energy between the pendulums 32 and 34, as illustrated generally in FIG. 4. Aligned mode oscillating energy from one pendulum, for example pendulum 32 swinging at its suspension points 56 and 58 in the common plane of oscillation is coupled by the aligned mode energy transfer coupling 80 of the suspension structure 36 through the post 40 (FIG. 1) to the aligned mode energy transfer coupling 80 of the other suspension structure 38 to the suspension points 66 and 68 of the other pendulum 34, and vice versa. The practical effect of the aligned mode energy transfer couplings 80 is that some of the aligned mode energy from one pendulum 32 will be transferred to the other pendulum 34, and vice versa, causing the two pendulums 32 and 34 to maintain the 180° phase difference during oscillation. Ultimately after enough time to transfer the aligned mode energy has occurred, both pendulums 32 and 34 will also have the same amount of oscillation energy due to the aligned energy mode transfer couplings 80.

As an example of aligned mode energy transfer, if one pendulum is stationary and the other pendulum is initially oscillating, some of the energy from the initially-oscillating pendulum will be transferred through the aligned mode energy transfer couplings 80 to the initially-stationary pendulum. The initially-stationary pendulum will commence oscillating at the same frequency as the initially-oscillating pendulum but with a 180° phase difference, due to the periodic nature of the aligned mode energy transfer from the initially-oscillating pendulum. The arc of oscillation of the initially-oscillating pendulum will diminish (assuming no energy input) and the arc of oscillation of the initially-stationary pendulum will increase, as the aligned mode energy transfer couplings 80 transfer energy from the initially-oscillating pendulum to the initially-stationary pendulum. The energy transfer between the two pendulums proceeds in this manner until both pendulums have the same amount of oscillatory energy. With the same amount of oscillatory energy, both pendulums experience the same oscillatory frequency, the same maximum amplitude points and the same arcs of oscillation. The oscillating energy transfer between the pendulums 32 and 34 continues until the two pendulums 32 and 34 have equal oscillating energies.

The nature of the aligned mode energy transfer is similar to the manner that a conventional tuning fork transfers energy from an initially vibrating tong to the other tong, causing both tongs to vibrate at the same frequency and amplitude but with a 180° phase difference. In the gravimeter 30, the aligned mode energy transfer is important in canceling anomalous seismic noise to yield greater accuracy in the gravity measurement, as explained below. The preferred characteristics of the aligned mode energy transfer couplings 80 are explained in greater detail below, principally in conjunction with FIGS. 17 and 18.

In contrast to the aligned mode energy transfer capabilities, the suspension structures 36 and 38 quickly absorb and thereby dissipate unwanted perpendicular mode energy. Unwanted perpendicular mode energy tends to force the pendulums 32 and 34 to oscillate in arcs of oscillation which are not in the common plane of oscillation of the pendulums. Unwanted perpendicular mode energy is typically induced by spurious external influences, such as jolting or rotating the gravimeter, as for example when it is moved in the borehole 44 (FIG. 1). Unwanted perpendicular mode energy has the capability of adversely affecting the oscillation of the pendulums. By quickly absorbing and dissipating the unwanted perpendicular mode energy, such unwanted energy has only a minimal and relatively rapid transitory effect on the desired oscillation of the pendulums. Errors in the measurement of gravity caused by unwanted perpendicular mode energy are thereby quickly eliminated or reduced in significance.

Unwanted perpendicular mode energy is any energy that is effective perpendicular to the aligned mode energy represented by the imaginary line 78, shown in FIGS. 2 and 3. Unwanted perpendicular mode energy is represented by imaginary arrows 82 and 84 shown in FIGS. 2 and 3. Arrows 82 and 84 extend perpendicular to one another and to the line 78. The arrow 82 extends perpendicularly to the line 78 and vertically within the common plane of oscillation. The arrow 84 extends horizontally and orthogonally from the common plane of oscillation. Any unwanted perpendicular mode energy which is effective perpendicular to the line 78 will have at least one component parallel to one or both of the arrows 82 and 84.

Figure 5:
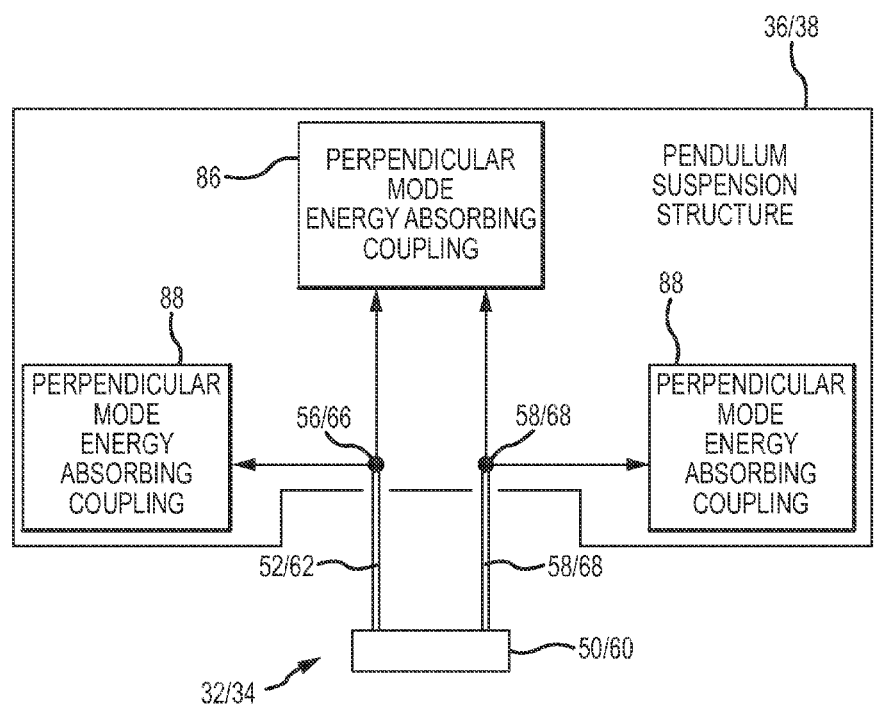
FIG. 5 is a block diagram of a perpendicular energy mode absorbing coupling within the suspension structures of the two pendulums of the gravimeter shown in FIGS. 1, 2 and 3.

Unwanted perpendicular mode energy absorbing couplings 86 and 88 are included in each pendulum suspension structure 36 and 38, as shown generally in FIG. 5. The perpendicular mode energy absorbing coupling 86 absorbs and quickly dissipates the unwanted perpendicular mode energy component represented by one of the arrows 82 or 84 (FIGS. 2 and 3), and the other perpendicular mode energy absorbing coupling 88 absorbs and quickly dissipates the unwanted perpendicular mode energy component represented by the other one of the arrows 84 or 82. In this capacity, the perpendicular mode energy absorbing couplings 86 and 88 prevent or diminish the effect of unwanted perpendicular mode energy on the desired oscillation of the pendulums 32 and 34. As a consequence, only the desirable aligned mode energy is substantially transferred between the pendulums. The preferred characteristics of the perpendicular mode energy absorbing couplings 86 and 88 are explained in greater detail below, principally in conjunction with FIGS. 17 and 18.

In some circumstances, it may be desirable to oscillate the pendulums 32 and 34 at a frequency other than their natural resonant frequency. This is achieved by adjusting the effective lengths of the pendulums. An adjustment to the effective length of each pendulum 32 and 34 is achieved by pendulum length controllers 74 and 76 (FIG. 1). The pendulum length controllers 74 and 76 are associated with the pendulum suspension structures 36 and 38, respectively.

Figure 6:
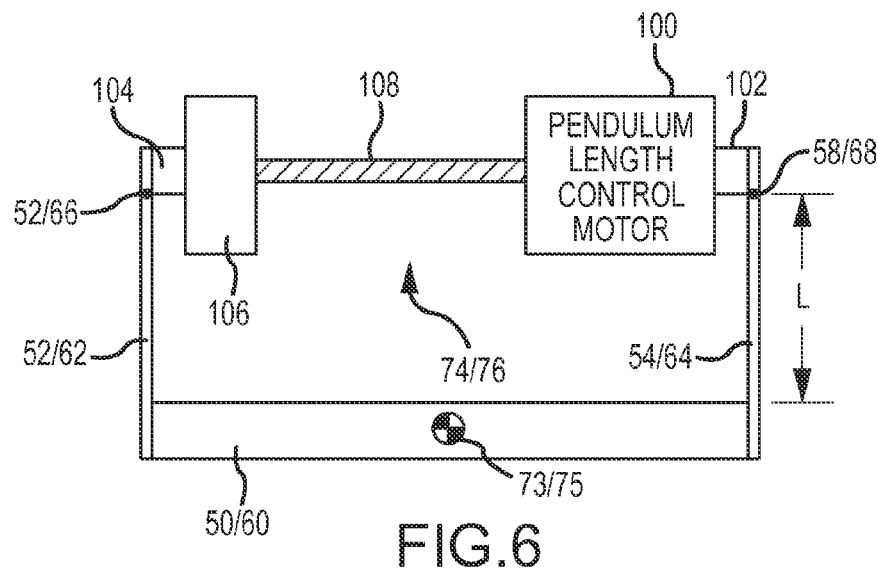
FIG. 6 is a generalized illustration and block diagram of a pendulum length controller of the gravimeter shown in FIG. 1.
Figure 7:
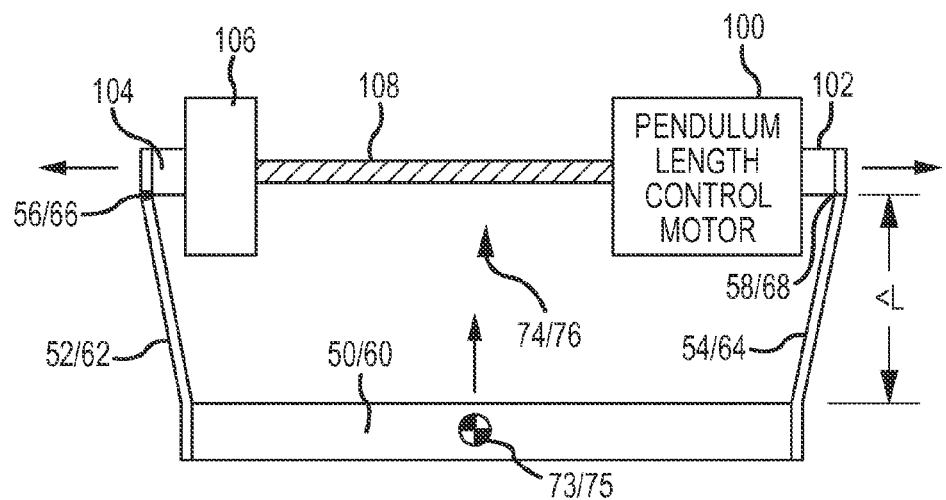
FIG. 7 is an illustration of using the pendulum length controller shown in FIG. 6 to shorten the effective length (L) of a pendulum.

One pendulum length controller 74 or 76 is shown greater detail in FIGS. 6 and 7. Each pendulum length controller is similar and each includes a pendulum length control motor 100 is connected to a suspension block 102. Another suspension block 104 is connected to a bearing block 106. A threaded shaft 108 extends from the motor 100 into the bearing block 106. Rotation of the shaft 108 by the motor 100 causes the distance between the suspension blocks 102 and 104 to increase or decrease, depending upon the direction of rotation of the shaft 100. One pendulum arm 52 or 62 is connected at its point of suspension 56 or 66 to the suspension block 102, and the other pendulum arm 54 or 64 is connected at its point of suspension 58 or 68 to the suspension block 104. The connections of the upper ends of the arms 52, 62 and 54, 64 to the suspension blocks 102 and 104 define the points of suspension 56, 58 and 58, 68, respectively. The lower ends of the arms 52, 62 and 54, 64 are rigidly connected to opposite ends of each pendulum bob 50 and 60, respectively. The effective length (L) of the arm of each pendulum 32 and 34 is defined by the distance between the points of suspension 56, 58 and 66, 68 and the the center of mass points 73 and 75 of the pendulum bobs 50 and 60.

To shorten the length (L) of the pendulum arm, the motor 100 is energized to rotate the shaft 108 and thereby separate the suspension blocks 102 and 104 from each other, as shown in FIG. 7, compared to FIG. 6. The separation of the suspension blocks 102 and 104 has the effect of moving the pendulum arms out of a parallel relationship into an angularly intersecting relationship relative to one another (FIG. 7). The angular relationship diminishes the vertical distance from the centers of mass 73 or 75 of one pendulum bob 50 or 60 to the points of suspension 56, 58 or 66, 68, thereby slightly diminishing the effective length of each pendulum arm (<L). Relative closer movement of the suspension blocks 102 and 104 by opposite rotation of the threaded shaft 108 by the motor 100 has the effect of increasing the effective length of each pendulum arm from its previously diminished length.

To achieve the same effective length of both pendulums 32 and 34, the one of the two pendulums which has the greater length is shortened to achieve the same effective length as the other pendulum. Shortening the effective length of the longer pendulum arm has the effect of increasing the frequency of oscillation of that pendulum, and lengthening the effective length of the pendulum arm has the effect of decreasing the frequency of oscillation. Adjustments in this manner achieve substantially identical and preselected frequencies of oscillation of both pendulums 32 and 34.

Figure 8:
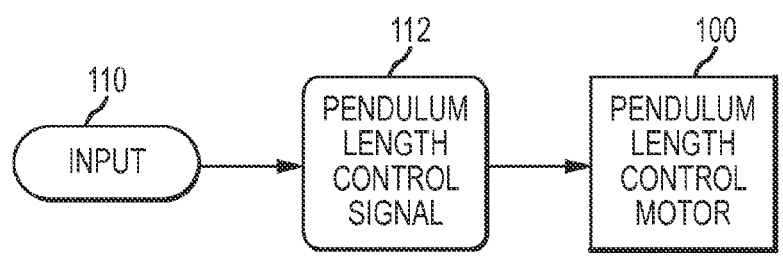
FIG. 8 is a flow and block diagram which illustrates control over the pendulum length controller shown in FIG. 6 to accomplish the adjustment shown in FIG. 7.

The manner by which the pendulum length control motor 100 is operated to separate the suspension blocks 102 and 104 and thereby achieve slight adjustments in the effective length (L) of the pendulums is shown in FIG. 8. A manual input 110 is applied to a device such as a switch (not shown) which generates a pendulum length control signal 112. That control signal 112 is applied to the pendulum length control motor 100, which causes the motor 100 to operate to adjust the length of the pendulum arm, as previously discussed. The type of manual input 110 may change the characteristics of the control signal 112 to cause the motor 110 to move in the selected forward or reverse direction.

Determinations of the amplitudes of movement of the oscillating pendulums 32 and 34 are achieved by amplitude sensors 120 and 122, shown generally in FIG. 1. The amplitude sensor 120 senses a maximum amplitude point in the arc of oscillation of the pendulum 32, and the amplitude sensor 122 senses a maximum amplitude point in the arc of oscillation of the pendulum 34. The amplitude sensors 120 and 122 optically sense the maximum amplitude points. Optically sensing the maximum amplitude points prevents any disruption to the natural oscillatory motion of the pendulums 32 and 34, that might otherwise occur if mechanical, electromagnetic or electrostatic position sensing techniques were employed. Such mechanical, electromagnetic or electrostatic sensing techniques may have the effect of adversely influencing the oscillation energy of the pendulums 32 and 34. Although not preferred, such other sensing techniques may nevertheless be employed in some circumstances due to the oscillation energy addition and subtraction capabilities of the double pendulum gravimeter 30 described next in conjunction with FIGS. 9 and 10.

The previously described techniques of establishing identical or nearly identical effective lengths and substantially equal and high Q's of both pendulums 32 and 34, and of transferring aligned mode energy while absorbing and dissipating undesirable perpendicular mode energy, causes both pendulums 32 and 34 to experience minimal energy loss when oscillating. However, even minimizing the energy loss does not prevent the pendulums from losing oscillation energy due to the inescapable frictional losses which occurs in any moving mechanical system. To avoid the complex computations necessary to calculate gravity values from a pendulum which is decaying in amplitude, energy is added to and subtracted from at least one of the pendulums 32 or 34 to cause both pendulums 32 and 34 to maintain constant amplitude while oscillating.

Figure 9:
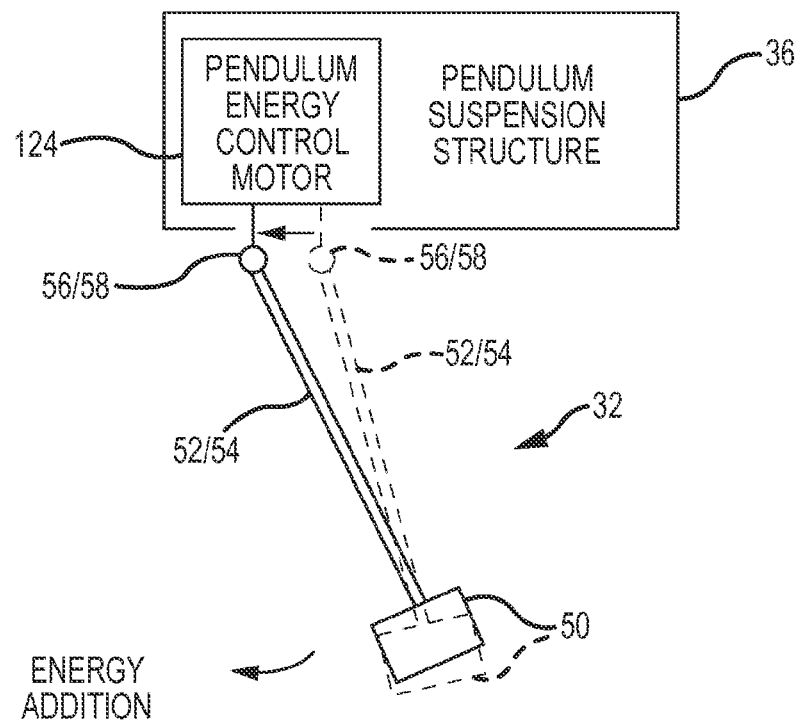
FIG. 9 is a block diagram and generalized illustration of a pendulum energy control motor of one pendulum of the gravimeter shown in FIG. 1, illustrating the addition of oscillation energy to increase the maximum amplitude points and the arc of oscillation of the pendulum.
Figure 10:
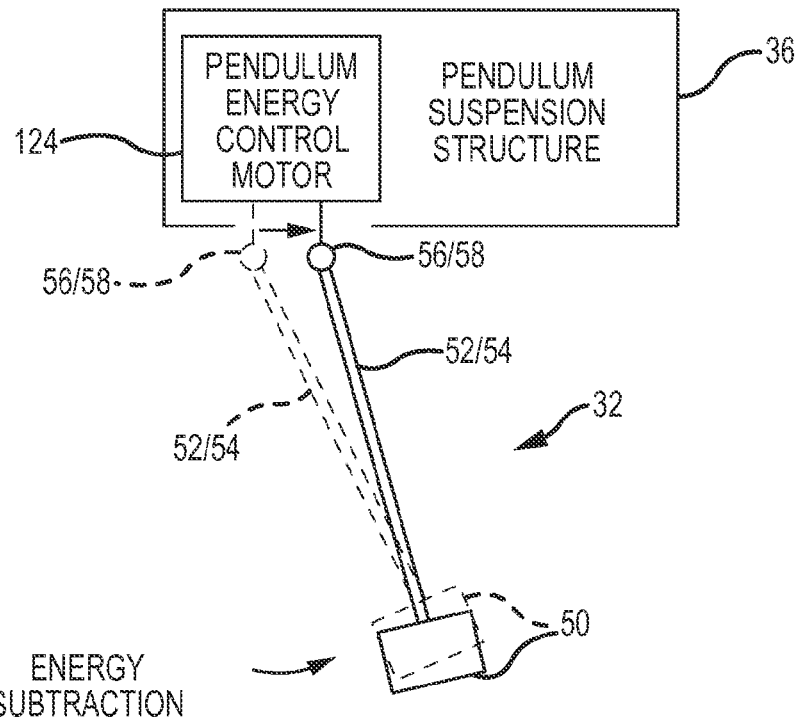
FIG. 10 is a block diagram and generalized illustration similar to FIG. 9, illustrating the subtraction of oscillation energy to decrease the maximum amplitude points and the arc of oscillation of the pendulum.

Energy is added to or subtracted from the pendulums 32 and 34 by a pendulum energy control motor 124, shown generally in FIGS. 9 and 10. One or both of the pendulum suspension structures 36 or 38 include an pendulum energy control motor 124. If only one of the suspension structures 36 or 38 includes a pendulum energy control motor 124, the energy added or subtracted by that one motor is transferred between the pendulums 32 and 34 through the aligned mode energy transfer coupling 80 (FIG. 4), thereby causing both pendulums 32 and 34 to achieve and maintain substantially the same maximum amplitude points and their arcs of oscillation after a transitory time. Only one energy control motor 124 and pendulum 32 are described below in connection with FIGS. 9 and 10, but a similar energy control motor 124 may be used with the other pendulum 34. In either case, the aligned mode energy transfer couplings 80 (FIG. 4) transfer the difference in oscillation energy of both pendulums between both pendulums until both pendulums achieve approximately equal oscillation energy. Using two energy control motors 124, one for each pendulum, more quickly establishes equal oscillation energy in both pendulums.

As shown in FIGS. 9 and 10, the energy control motor 124 is operatively connected to the suspension points 56 and 58 of the pendulum arms 52 and 54. When activated, the pendulum energy control motor 124 moves the suspension points 56 and 58 to the left as shown in FIG. 9 or to the right is shown in FIG. 10.

To add oscillating energy to the pendulum 32, the control motor 124 moves the suspension points in the direction that the pendulum bob 50 will move after having reached its maximum amplitude point in its arc of oscillation. This situation is illustrated in FIG. 9 where the pendulum bob 50 has reached its maximum amplitude point from oscillation movement to the right (as shown). At that point the suspension points 56 and 58 are momentarily moved or shifted slightly to the left (as shown by the solid lines relative to the dashed lines). Momentarily shifting the suspension points 56 and 58 to the left (as shown) when the pendulum bob 50 is at its maximum amplitude point at the right end of the arc of oscillation (as shown) has the effect of slightly elevating the pendulum bob 50 compared to the vertical position that the pendulum bob would otherwise occupy if the suspension points 56 and 58 had not been shifted to the left. Shifting the suspension points 56 and 58 in this manner momentarily increases the arc of oscillation of the pendulum bob 50, as shown by the dashed and solid lines in FIG. 9. Shifting the suspension points 56 and 58 in this manner adds potential energy to the pendulum bob 50, and that added potential energy is then converted into added kinetic energy and momentum during the following period (T) when the pendulum 32 swings in the other direction. The added energy maintains a desired constant maximum amplitude point of the pendulum bob 50 in its arc of oscillation (FIGS. 2 and 3).

In circumstances where anomalous external affects, such as jolting or rotation of the gravimeter, have added excess oscillation energy and thereby increased the maximum amplitude points in the arc of oscillation of one or more of the pendulums beyond the desired maximum amplitude point, the pendulum energy control motor 124 is activated to subtract or eliminate oscillating energy from the pendulum 32, as shown in FIG. 10.

To subtract oscillating energy from the pendulum 32, the control motor 124 moves the suspension points in the opposite direction that the pendulum bob 50 will move after having reached its maximum amplitude point in its arc of oscillation. This situation is illustrated in FIG. 10, where the pendulum bob 50 has reached its maximum amplitude point from oscillation to the right (as shown). At that point the suspension points 56 and 58 are momentarily moved or shifted slightly to the right (as shown by the solid lines relative to the dashed lines). Momentarily shifting the suspension points 56 and 58 slightly to the right (as shown) when the pendulum bob 50 is at its maximum amplitude point at the right end of the arc of oscillation (as shown) has the effect of slightly lowering the pendulum bob 50 compared to the vertical position that the pendulum bob would otherwise occupy if the suspension points 56 and 58 had not been shifted to the right. Shifting the suspension points 56 and 58 in this manner momentarily decreases the arc of oscillation of the pendulum bob 50, as shown by the dashed and solid lines in FIG. 10. Shifting the suspension points 56 and 58 in this manner subtracts potential energy from the pendulum bob 50, and that reduced potential energy is then converted into reduced kinetic energy and momentum during the following period (T) when the pendulum 32 swings in the other direction. The decreased energy maintains a desired constant maximum amplitude point of the pendulum bob 50 in its arc of oscillation (FIGS. 2 and 3).

Although energy addition and subtraction have been described in FIGS. 9 and 10 as occurring when the pendulum bob 50 has reached its maximum amplitude point in its arc of oscillation, energy may also be added and subtracted when the pendulum is moving in its arc of oscillation between its maximum amplitude points. In this case, energy is added by moving the suspension points 56 and 58 in the same direction that the pendulum bob 50 is moving in its arc of oscillation, and energy is subtracted by moving the suspension points 56 and 58 in the opposite direction that the pendulum bob 50 is moving in its arc of oscillation.

Figure 11:
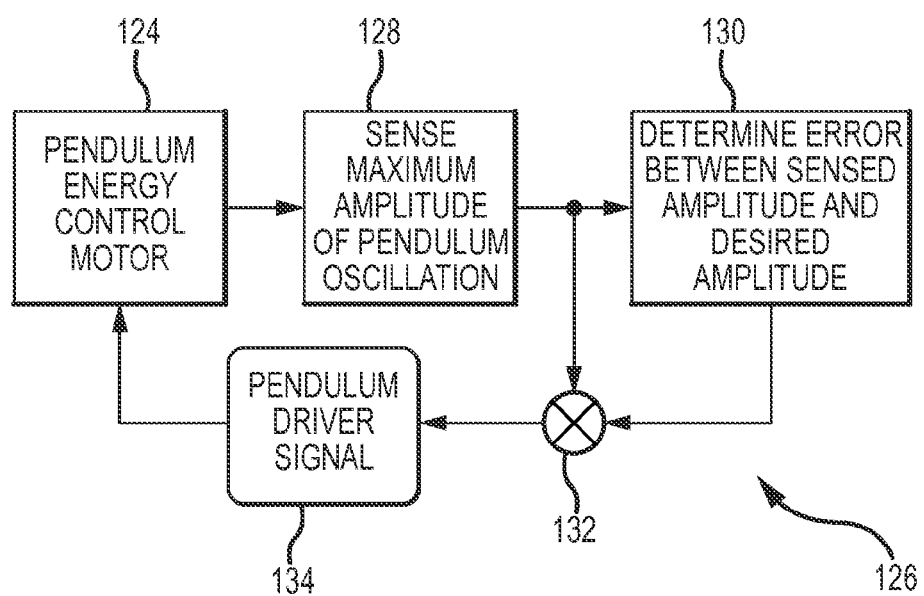
FIG. 11 is a block diagram of an energy feedback control system for maintaining a constant maximum amplitude point in the arc of oscillation of the pendulum by the addition and subtraction of oscillation energy as shown in FIGS. 9 and 10.

An energy feedback controller 126, shown in FIG. 11, controls and regulates the energy addition and subtraction achieved by the pendulum energy control motor 124 (FIGS. 9 and 10). The energy feedback controller 126 controls the amplitude and arc of oscillation of one oscillating pendulum to which an energy control motor 124 is connected. A similar controller 126 may be used with the pendulum energy control motor associated with other pendulum. Using two separate energy control motors to separately regulate the oscillatory energy of each pendulum 32 and 34 allows energy to be added to or subtracted from each pendulum more quickly, and thereby achieves quicker oscillation energy regulation of both pendulums. However, if two separate pendulum energy control motors 124 and controllers 126 are not used in the gravimeter, the aligned mode energy transfer coupling 80 (FIG. 4) will transfer energy to regulate the maximum amplitude points of the other pendulum to which an energy control motor and controller is not connected, although the regulation will be achieved more slowly due to the finite amount of time for energy to be transferred through the aligned mode energy transfer coupling 80 (FIG. 4).

In the controller 126 shown in FIG. 11, the maximum amplitude point in the arc of oscillation of the pendulum is sensed at 128, by use of an amplitude sensor 120 or 122 (FIG. 1). A desired maximum amplitude point of the arc of oscillation is preestablished, so any deviation of the actual maximum amplitude point from the preestablished maximum amplitude point constitutes an error. The amount of the error is determined at 130 by subtracting the sensed maximum amplitude from the preestablished maximum amplitude. A positive error value indicates that the sensed maximum amplitude is less than the preestablished maximum amplitude point and indicates that oscillation energy should be added to the pendulum. A negative error value indicates that the sensed maximum amplitude exceeds the preestablished maximum amplitude point and indicates that oscillation energy should be subtracted from the pendulum. The plus or minus value of the error signal is multiplied, at 132, by the maximum amplitude sensed at 128, and the result of that multiplication becomes a pendulum driver signal 134.

The pendulum driver signal 134 is either positive or negative. The pendulum driver signal 134 is applied to the pendulum energy control motor 124. A positive pendulum driver signal 134 causes the energy control motor 124 to shift in a direction to add energy to the oscillating pendulum (FIG. 9), and a negative pendulum driver signal 134 causes the energy control motor 124 to shift in a direction to subtract energy from the oscillating pendulum (FIG. 10).

Adding and subtracting oscillatory energy to maintain constant amplitude points in the arcs of oscillation of the pendulums permits more accurate gravitational determinations compared to the complicated correction factor calculations required when the pendulum has a decreasing amplitude and arc of oscillation. Only a single relatively simple mathematical correction factor is needed to correct equations (1)-(3) to compensate for the arc of oscillation, compared to continuously deriving and applying complex mathematical correction factors when the arc of oscillation is decreasing. Furthermore, determinations of gravity are achieved more rapidly because it is unnecessary to add energy to the decaying pendulum until it regains a satisfactory amplitude and allow the motion of the pendulum to stabilize as it decays before calculating the gravity value.

Although the pendulum energy control motor 124 shown in FIGS. 9 and 10 is shown moving the suspension points 56 and 58 to the left and right to add and subtract energy, respectively, it is also possible to add energy to and subtract energy from the oscillating pendulum by moving the suspension points 56 and 58 vertically upward and downward relative to the line 78 (FIGS. 2 and 3) when the pendulum bob is at a maximum amplitude point. Such vertical movements add or subtract potential energy, which changes the oscillating energy of the pendulum and thereby changes the maximum amplitude points in the arc of oscillation. However, moving the suspension points 56 upward or downward to add or subtract energy requires considerably more movement or more energy input than moving the suspension points 56 and 58 to the right or left (as shown). For example, about 1000 times more vertical movement is required to transfer an equivalent amount of oscillation energy compared to the left and right movement described above (FIGS. 9 and 10).

Figure 12:
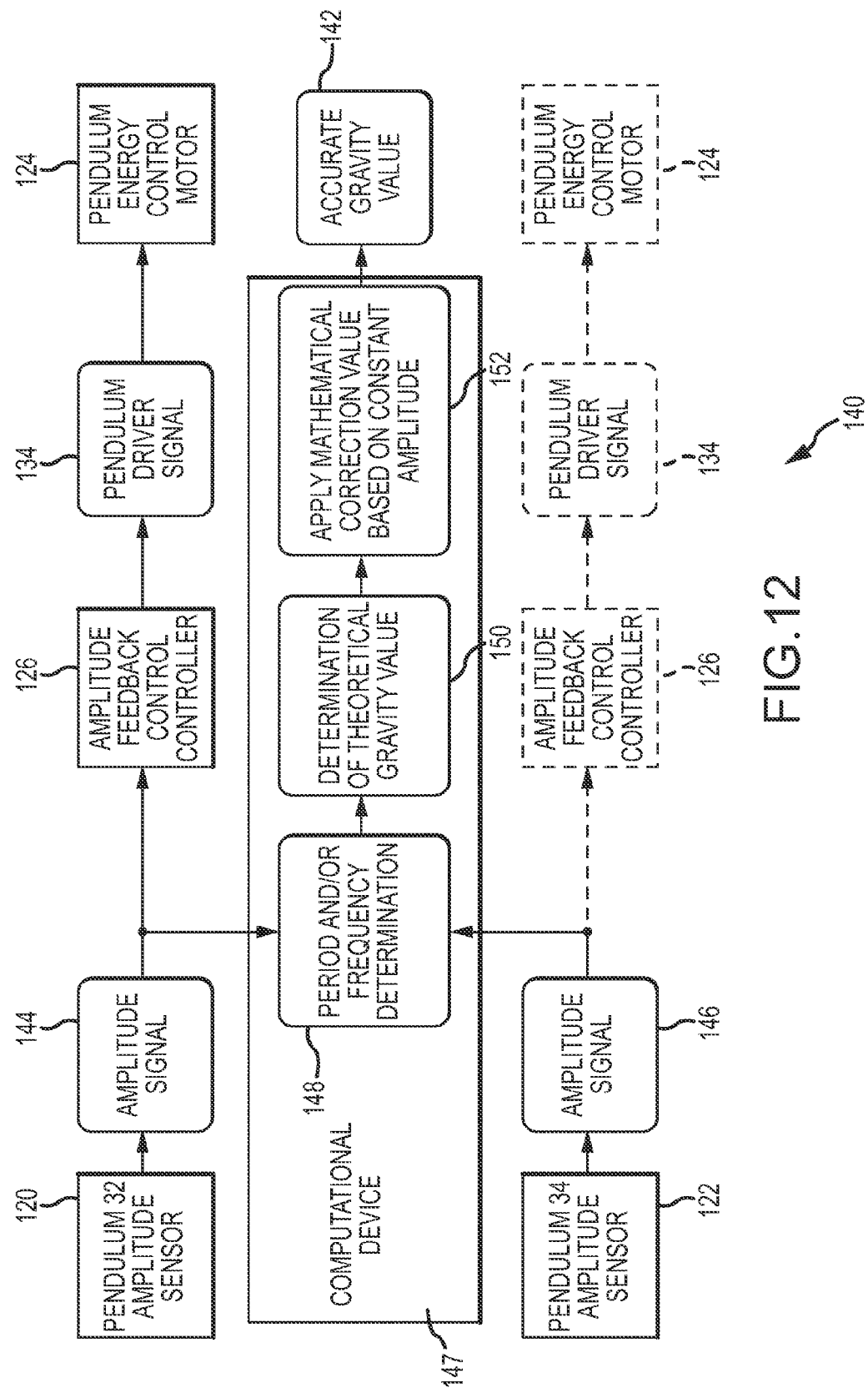
FIG. 12 is a block and functionality diagram showing the determination of a value of gravity based on the oscillatory characteristics of the pendulums of the gravimeter shown in FIG. 1, with certain blocks and functions shown in phantom to illustrate optional use.

An operational system 140 for the double pendulum gravimeter 30, shown in FIG. 12, produces accurate gravity values 142. The amplitude sensors 120 and 122 derive amplitude signals 144 and 146 which represent the maximum amplitude points in the arcs of oscillation of the pendulums 32 and 34, respectively. The amplitude signal 144 is applied to the amplitude feedback controller 126 (FIG. 11) associated with the pendulum 32 as shown in FIG. 12. The controller 126 supplies the pendulum driver signal 134 to the pendulum energy control motor 124 (FIGS. 9 and 10) to add and subtract energy and thereby control and maintain the constant maximum amplitude point of the pendulum 32 in its arc of oscillation. If the other pendulum 34 does not include its own amplitude feedback controller 126, the oscillation energy added to or subtracted from the pendulum 32 is transferred to the pendulum 34 through the aligned mode energy transfer coupling 80 (FIG. 4) until both pendulums achieve the desired constant maximum amplitude points in their arcs of oscillation. If the other pendulum 34 does include its own pendulum energy control motor 124 and its own amplitude feedback controller 126 (as indicated by the dashed line depiction in FIG. 12), the aligned mode energy transfer coupling 80 (FIG. 4) transfers energy between the pendulums 32 and 34 until both pendulums achieve the desired constant maximum amplitude points in their arcs of oscillation. Thus, oscillation energy is added to and subtracted from both pendulums to control and maintain the constant maximum amplitude points of their arcs of oscillation.

Based on the amplitude signals 144 and 146, a computational device 147 makes a determination at 148 of the period (T) and/or frequency (f) of sine waves representing the oscillations of the pendulums 32 and 34. The sine wave representations are derived by fitting the maximum amplitude points of the arcs of oscillation of the pendulums into sine wave representations. The manner of determining these individual sine wave representations is described in greater detail below in conjunction with FIG. 13. The sine wave representations determined at 148 define the period (T) and/or frequency (f) of the oscillation of each pendulum 32 and 34. The computational device 147 may be a computer which has been programmed to perform the functions described herein.

The period (T) and/or frequency (f) determined at 148 is thereafter used by the computational device 147 to determine the theoretical value of gravity at 150. The determination of the theoretical value of gravity at 150 is made by applying the previously determined period (T) and/or frequency (f) in the equations (2) and (3), recognizing that the effective length (L) of each pendulum 32 and 34 is known from the construction, setup and use of the gravimeter 30. The theoretical gravity value determined at 150 using equations (2) and (3) does not correct for the angle of oscillation.

At 152, a computational device 147 applies a mathematical correction factor to the theoretical gravity value determined at 150 to compensate for the angle of oscillation of the pendulums 32 and 34, since their arcs of oscillation are not infinitesimally small. The arcs of oscillation are correlated to the maximum amplitude point signals 144 and 146 of the pendulums 32 and 34, as sensed by the sensors 120 and 122. The mathematical correction factor is based on the angle of oscillation and is derived using known principles, exemplified by those contained in the Heiskanen and Meinesz publication referred to above. Only a single mathematical correction factor is required to be calculated, because the pendulums 32 and 34 have preestablished maximum amplitude points and arcs of oscillation due to the oscillation energy regulation described above. Applying a single previously calculated correction factor at 152 to the theoretical gravity value determined at 150 is a significant benefit compared to deriving and applying complex mathematical correction factors which must be continually re-calculated and re-applied as the oscillation of a pendulum decays. Applying the mathematical correction value at 152 to the theoretical gravity value derived at 150 establishes the accurate gravity value 142.

Figure 13:
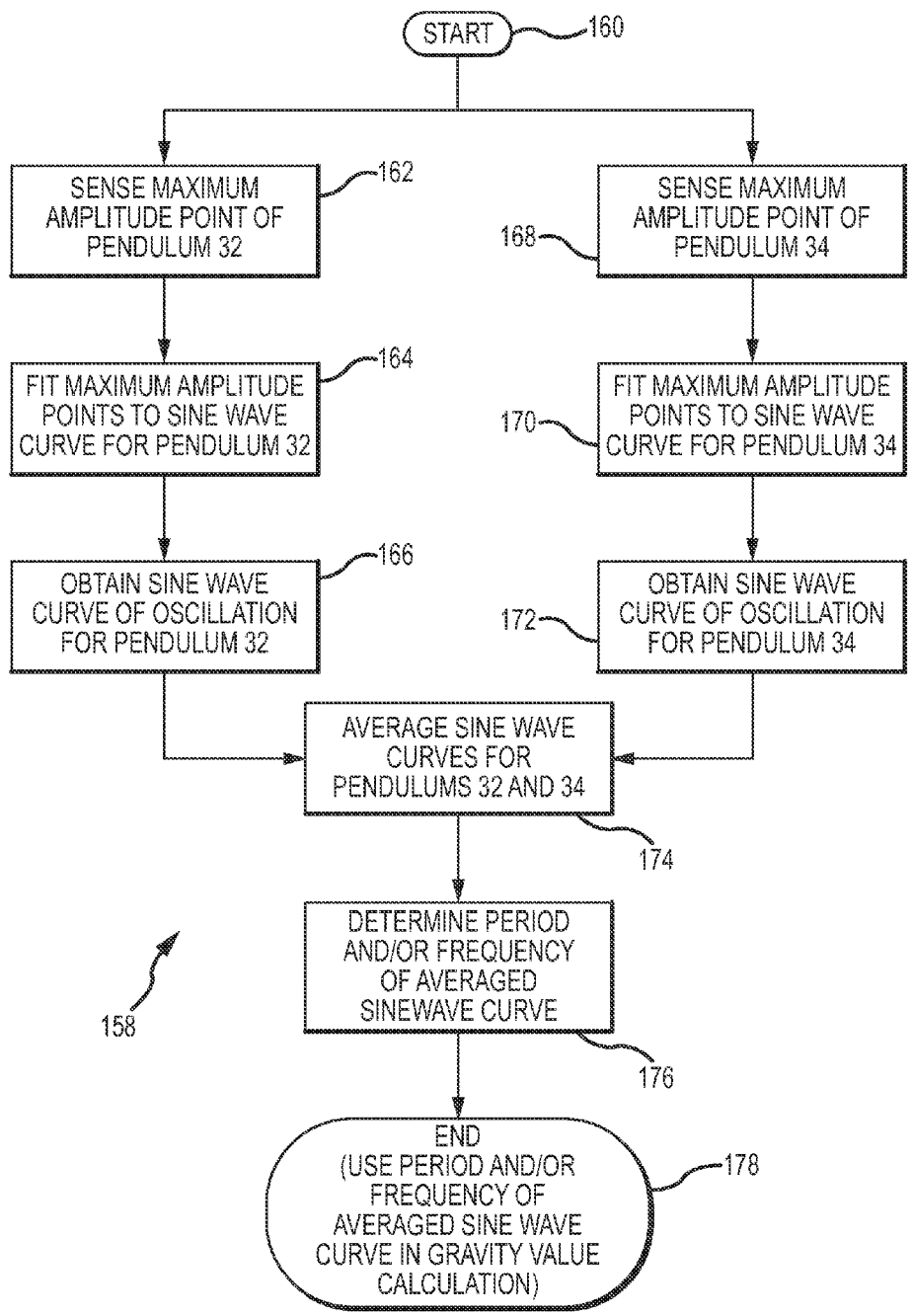
FIG. 13 is a flow diagram of functions performed to determine the period (T) and frequency (f) of the oscillation of the pendulums of the gravimeter shown in FIG. 1, when determining the gravity value as shown in FIG. 12.

The details of determining the period (T) or frequency (f) of the oscillatory motion of each pendulum 32 and 34, shown generally at 148 in FIG. 12, are explained by the process flow 158 illustrated in FIG. 13. The process flow 158 is executed by the computational device 147 (FIG. 12) and begins at 160. At 162, the maximum amplitude points of the pendulum 32 are sensed by the amplitude sensor 120 for a series of oscillations of the pendulum 32. The maximum amplitude points are then fitted to a sine wave curve at 164, using conventional graphical fitting algorithms. Fitting the maximum amplitude points to a sine wave curve at 164 results in an accurate sine wave curve representation at 166 of the oscillatory motion of the pendulum 32. The sine wave curve representation at 166 describes the oscillatory motion of the pendulum 32.

A similar situation occurs with respect to the pendulum 34. At 168, the maximum amplitude points of the pendulum 34 are sensed by the amplitude sensor 122 for a series of oscillations of the pendulum 34. The maximum amplitude points are then fitted to a sine wave curve at 170, using conventional graphical fitting algorithms. Fitting the maximum amplitude points to a sine wave curve at 170 results in an accurate sine wave curve representation at 172 of the actual oscillatory motion of the pendulum 34. The sine wave curve representation 162 describes the oscillatory motion of the pendulum 34.

Deriving the sine wave curves which represent the oscillation characteristics of the pendulums 32 and 34, by fitting the maximum amplitude points to a sine wave representation of those oscillation characteristics (166 and 172, FIG. 13), is typically more accurate than attempting to directly extrapolate the period (T) or frequency (f) from maximum amplitude points derived at 162 and 168. However, such direct extrapolation from the maximum amplitude points may also be used under appropriate conditions.

The two sine wave curves obtained at 166 and 172 are thereafter averaged at 174. The averaging at 174 has the effect of eliminating seismic noise as a factor which would otherwise degrade the accuracy of the gravity measurement. Because the pendulums 32 and 34 have a 180° phase oscillating relationship with respect to one another, the effects from seismic noise add oscillating energy to one pendulum 32 or 34 while simultaneously subtracting the same amount of oscillating energy from the other pendulum 34 or 32. The added and subtracted energy from seismic noise oppositely affects the oscillation energy of two pendulums, and is reflected in slight variations of the two sine wave curve representations obtained at 166 and 172. Averaging the two sine wave curve representations of the oscillation characteristics of both pendulums has the net effect of eliminating the seismic noise, because the added and subtracted oscillation energy is canceled in the averaged sine wave curve representation obtained at 174.

The averaged sine wave curve representation obtained at 174 represents the effect of gravity on the period (T) and the frequency (f) of the pendulums 32 and 34. The period (T) and/or the frequency (f) of the averaged sine wave curve representation is determined at 176. The process flow 158 ends at 178, with the period (T) and/or frequency (f) of the averaged sine wave curve being used by the computational device 147 at 150 to determine the accurate gravity value 142 (FIG. 12).

An actual embodiment of the double pendulum gravimeter 30 which incorporates the previously described components and functionality, other than the computational device 147 (FIG. 12), is shown and described in conjunction with FIGS. 14-21.

Details of the pendulum suspension structures 36 and 38 and their connection to the support post 40 are shown and described in FIGS. 14-18. The post 40 is T-shaped and has arm extensions 200 and 202 extending in opposite transverse directions from one another above the base 42. The suspension structures 36 and 38 are connected to and supported by the arm extensions 200 and 202, respectively, above the base 42. The base 42 is preferably circular in configuration to fit within a housing or vessel (not shown) for the gravimeter 30 that is inserted into the borehole.

Figure 16:
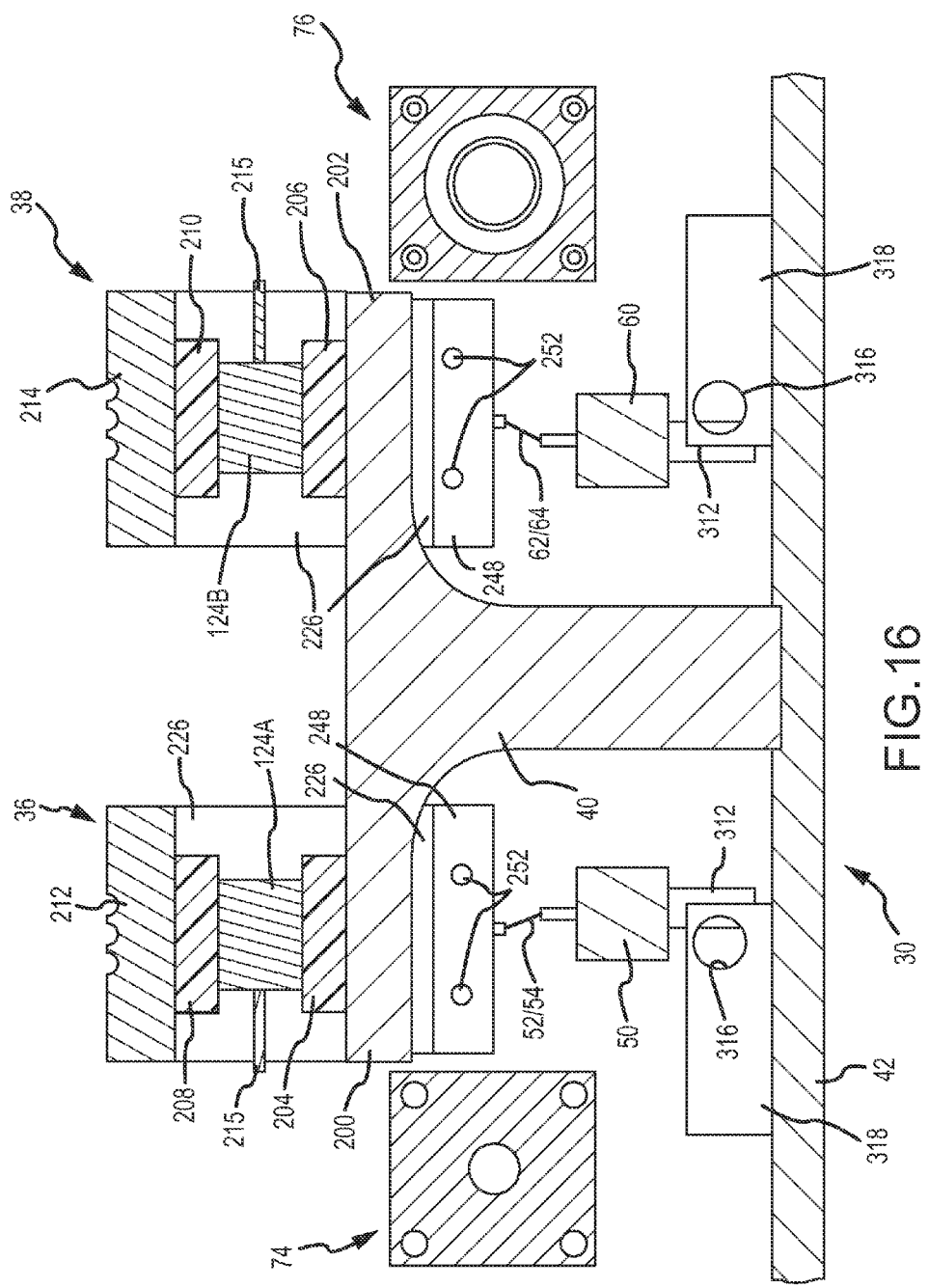
FIG. 16 is a vertical section view of FIG. 15, taken substantially in a common plane of oscillation of both pendulums, extending through both pendulums, both pendulum support structures, both pendulum length controllers and a post, all of which are shown in FIGS. 1, 14 and 15.

Rigid lower electrical insulators 204 and 206, shown best in FIG. 16, are respectively connected to the top surfaces of the arm extensions 200 and 202. Separate pendulum energy control motors 124A and 124B are rigidly attached to the respective top surfaces of the rigid lower electrical insulators 204 and 206. Upper electrical insulators 208 and 210 are rigidly attached to the respective upper surfaces of the pendulum energy control motors 124A and 124B. Frame pieces 212 and 214 are rigidly connected to the upper electrical insulators 208 and 210, respectively. The remaining components of the pendulum suspension structures 36 and 38 are directly or indirectly connected to the frame pieces 212 and 214.

The pendulum energy control motors 124A and 124B preferably include piezoelectric material. Electrical pendulum driver signals 134 (FIG. 12) are applied to terminals 215 of each piezoelectric control motor 124A and 124B. In response to the electrical pendulum driver signals, the piezoelectric material of each control motor 124A and 124B changes in physical configuration in a well-known manner, thereby shifting the upper insulators 208 and 210 and the frame pieces 212 and 214 to the left and right (FIGS. 9 and 10). Shifting the frame pieces 212 and 214 shifts the entire pendulum suspension structures 36 and 38, causing the suspension points 56, 58 and 66, 68 to shift to the left and right to add energy to and subtract energy from the oscillating pendulums 32 and 34, as previously discussed in conjunction with FIGS. 9 and 10.

The polarity of the pendulum driver signals 134 (FIG. 12) controls the direction of shifting movement of the control motors 124A and 124B. The lower and upper electrical insulators 204, 206 and 208, 210 insulate the pendulum energy control motors 124A and 124B from the other components of the gravimeter 30, thereby permitting the electrical pendulum driver signals to energize the control motors 124A and 124B without short-circuiting to the other components of the gravimeter.

The two pendulum suspension structures 36 and 38 are of similar construction. The details of both suspension structures 36 and 38 are represented by the pendulum suspension structure 38, shown best in FIGS. 17 and 18. As previously noted, all of the components of the pendulum suspension structure 38 are connected to and supported by the frame piece 214. Two vertically oriented suspension plates 216 and 218 are connected at their upper ends to the left side (as shown) of the frame piece 214. The upper end of the suspension plate 218 contacts the left side (as shown) of the frame piece 214. A spacer block 220 is positioned between the upper ends of the suspension plates 216 and 218. A connection block 222 is connected to the left side (as shown) of the upper end of the suspension plate 216. Bolts 224 (FIG. 18) retain the connection block 222, the upper end of the suspension plate 216, the spacer plate 220 and the upper end of the suspension plate 218 in a rigid assembled relationship connected to the left side (as shown) of the frame piece 214.

In a similar manner, two vertically oriented suspension plates 226 and 228 are connected at their upper ends to the right side (as shown) of the frame piece 214. The upper end of the suspension plate 226 contacts the right side (as shown) of the frame piece 214 at its upper end. A spacer block 230 is positioned between the upper ends of the suspension plates 226 and 228. A connection block 232 is connected to the right side (as shown) of the upper end of the suspension plate 228. Bolts 234 (FIG. 18) retain the connection block 232, the upper end of the suspension plate 228, the spacer plate 230 and the upper end of the suspension plate 226 in a rigid assembled relationship connected to the right side (as shown) of the frame piece 214.

The lower ends of the suspension plates 216 and 218 are held in a spaced apart relationship by a spacer block 236. A retention block 238 is positioned on the right side (as shown) of the lower end of the suspension plate 218. The suspension block 102 is positioned on the left side (as shown) of the suspension plate 216. Bolts 242 hold the retention block 238, the lower end of the suspension plate 218, and the spacer block 236, the lower end of the suspension plate 216 and the suspension block 102 in an assembled and connected relationship. Similar thicknesses of the spacer blocks 220 and 236 cause both suspension plates 216 and 218 to extend generally parallel to one another.

In a similar manner, the lower ends of the suspension plates 226 and 228 are held in a spaced apart relationship by a spacer block 246. A retention block 248 is positioned on the left side (as shown) of the lower end of the suspension plate 226. The suspension block 104 is positioned on the right side (as shown) of the suspension plate 228. Bolts 252 hold the retention block 248, the lower end of the suspension plate 226, the spacer block 246, the lower end of the suspension plate 228 and the suspension block 104 in an assembled and connected relationship. Similar thicknesses of the spacer blocks 230 and 246 cause both suspension plates 226 and 228 to extend generally parallel to one another. In addition, the parallel suspension plates 226 and 228 also extend in a generally parallel relationship with the parallel suspension plates 216 and 218.

Figure 17:
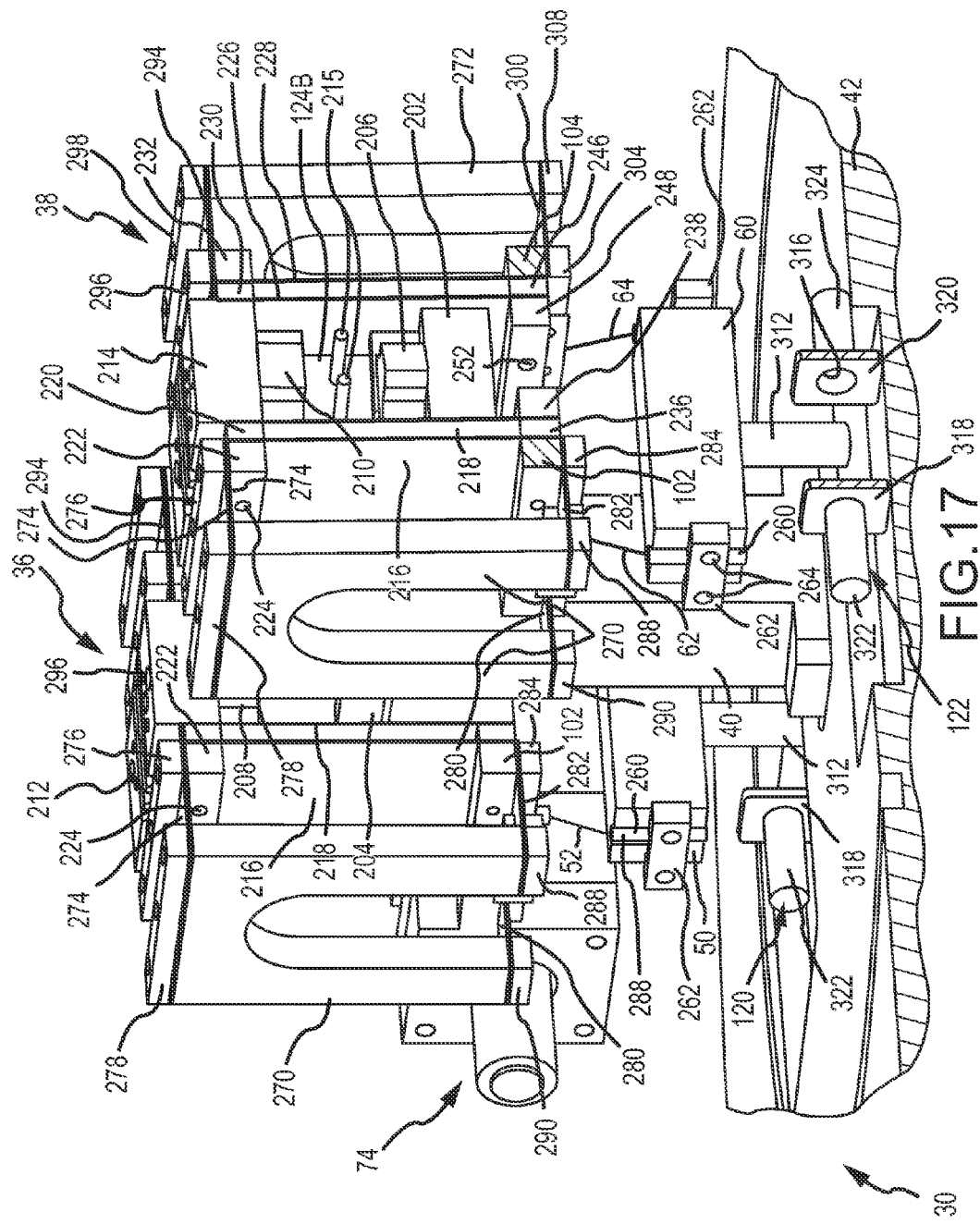
FIG. 17 is another and enlarged view of the subject matter shown in FIG. 15, taken from a different perspective with certain portions broken away.
Figure 18:
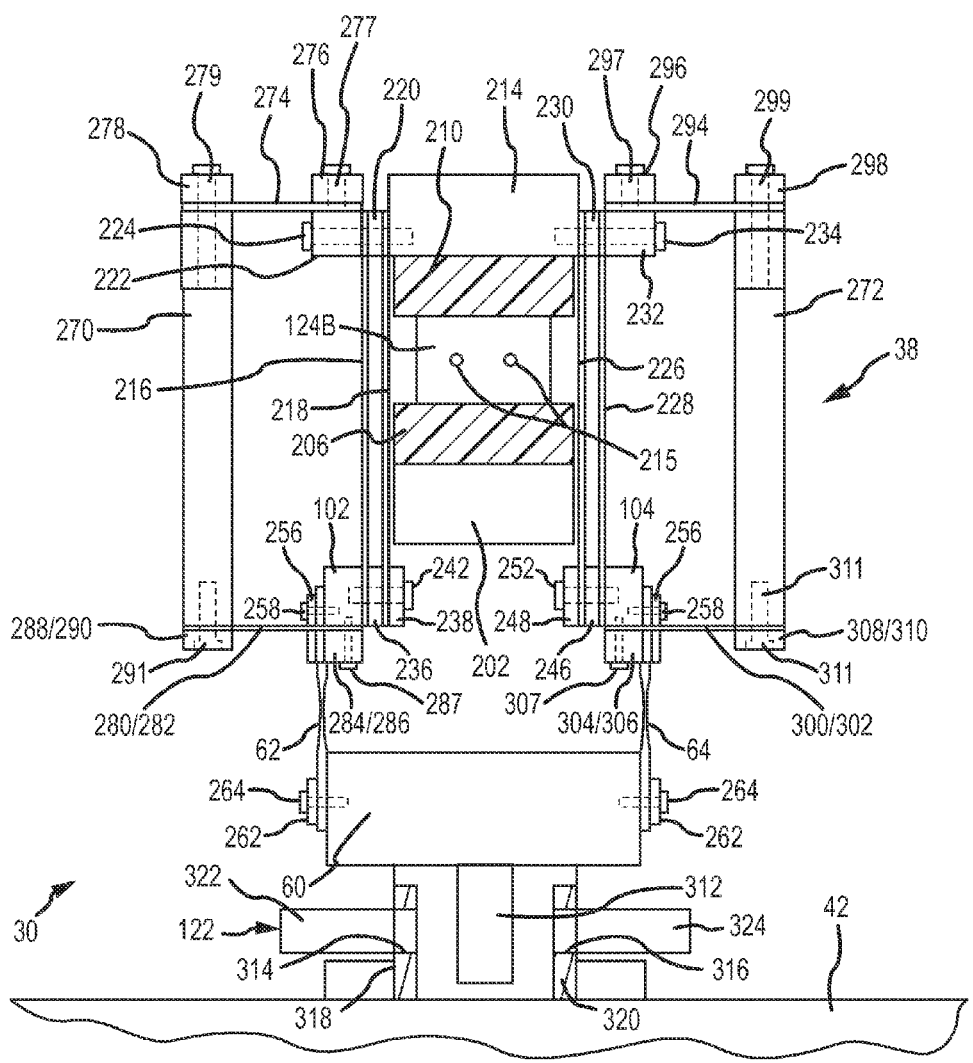
FIG. 18 is a vertically sectioned end view of the right hand pendulum support structure shown in FIG. 17, taken in a plane perpendicular to the view shown FIG. 16.

The upper ends of the pendulum arms 62 and 64 of the pendulum 34 are connected to the suspension blocks 102 and 104, respectively (FIG. 18). The pendulum arms 62 and 64 are connected to the pendulum suspension structure 38 and to the pendulum bob 60, as shown in FIGS. 17 and 18, in the same manner that the pendulum arms 52 and 54 are connected to the pendulum suspension structure 36 and to the pendulum bob 50 (FIGS. 1 and 14-16).

Figure 14:
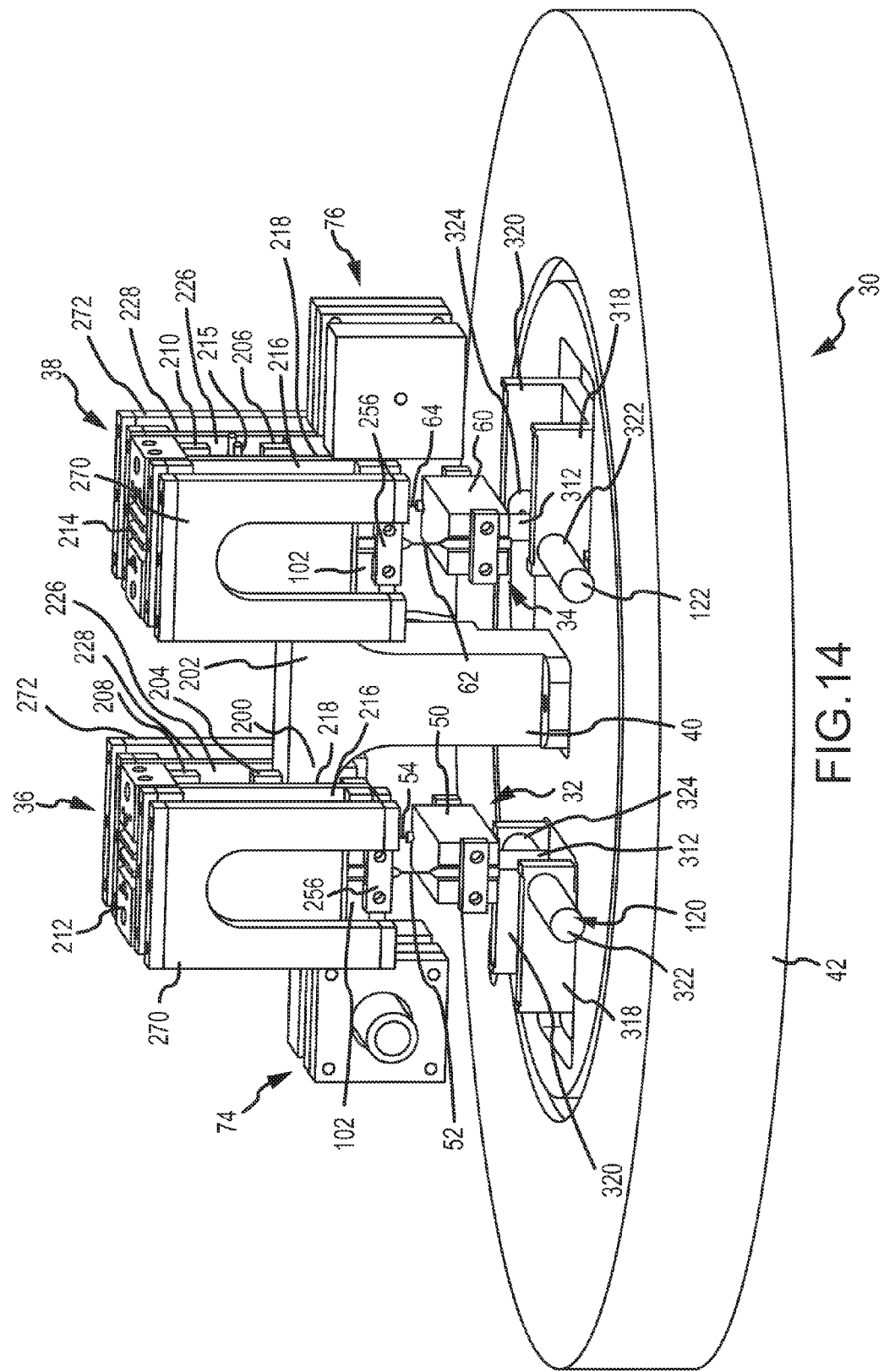
FIG. 14 is a perspective view of an actual embodiment of the gravimeter which is shown generally in FIG. 1.
Figure 15:
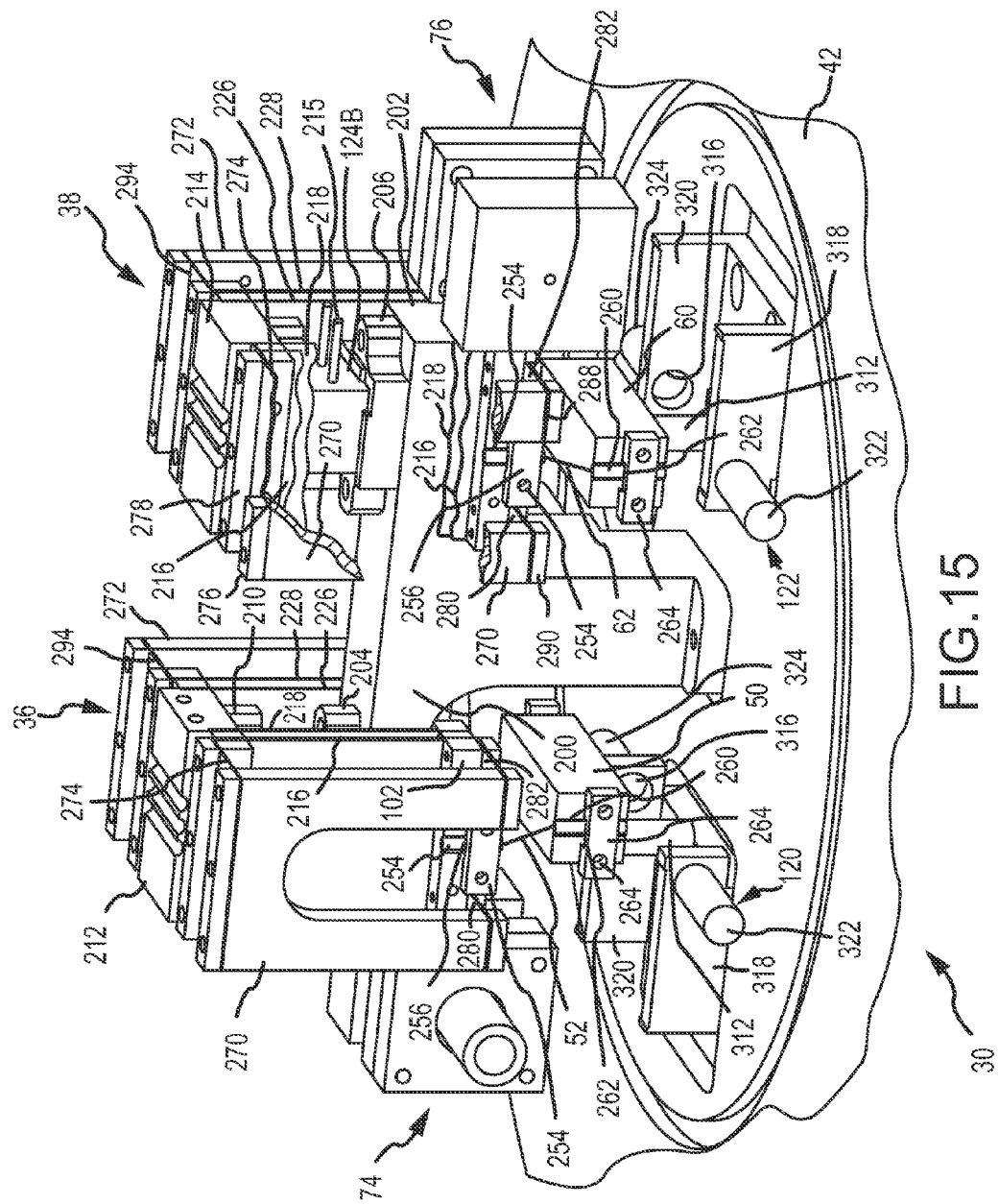
FIG. 15 is an enlarged view of a portion of FIG. 14, with certain portions broken away.

The respective left and right outside vertical surfaces (shown in FIG. 18) of each suspension block 102 and 104 are formed with a vertically extending groove 254 (FIGS. 14 and 15). A clamp 256 is retained by screws 258 (FIG. 18) to each suspension block 102 to retain each upper end of the pendulum arms 62 and 64 within its own groove 254. Each lower end of the pendulum arms 62 and 64 is attached to opposite outside ends of the elongated pendulum bob 60. Vertically extending grooves 260 are formed in the left and right end surfaces of the pendulum bob 60, as shown in FIGS. 14, 15, 17 and 19. A clamp 262 is retained by screws 264 to each end surface of the pendulum bob 60 to hold the lower ends of the pendulum arms 62 and 64 within the grooves 260.

Thus as described, the upper ends of each pendulum arm 62 and 64 are rigidly connected to the suspension blocks 102 and 104 of the pendulum suspension structure 38, and the lower ends of each pendulum arms 62 and 64 are rigidly connected to the opposite ends of the pendulum bob 60. The same situation exists with respect to the pendulum arms 52 and 54 and their connection to the pendulum suspension structure 36 and the pendulum bob 50 (FIG. 1). The pendulum bobs 50 and 60 are thereby suspended for oscillatory movement from the suspension blocks 102 and 104 which are held by the suspension plates 216, 218 and 226, 228 of the suspension structures 36 and 38, respectively. Oscillation occurs by flexing of the pendulum arms 52, 54 and 62, 64 between the rigidly connected upper and lower ends of those pendulum arms, as is discussed more completely below in connection with FIGS. 20 and 21.

Energy absorber plates 270 and 272 are positioned on the left and right sides of the pendulum suspension structures 36 and 38, as shown in FIGS. 14, 15, 17 and 18. The energy absorber plates 270 and 272 absorb and dissipate the undesirable perpendicular mode energy that will adversely influence the oscillation of the pendulums 32 and 34 in their common plane of oscillation. Each energy absorber plate 270 and 272 as an inverted U-shaped formed from its lower edge upward into each plate.

The absorber plate 270 is connected at its upper end to an upper horizontal connection plate 274 which extends substantially along the length of the connection block 222. A cap strip 276 and screws 277 rigidly connect the right end (as shown) of the horizontal connection plate 274 to the connection block 222. The left end (as shown) of the horizontal connection plate 274 is rigidly connected to the upper end of the absorber plate 270 by a cap strip 278 and screws 279.

Two partial-length lower horizontal connection plates 280 and 282 (FIGS. 15, 17 and 18) connect the lower end of the absorber plate 270 to the suspension block 102. Cap strips 284 and 286 and screws 287 rigidly connect the right ends (as shown) of the partial-length horizontal connection plates 280 and 282 to the suspension block 102. The left ends (as shown) of the two partial-length horizontal plates 280 and 282 are rigidly connected to the lower end of the absorber plate 270 by cap strips 288 and 290 and screws 291. The space between the two lower partial-length horizontal connection plates 280 and 282 permits the pendulum arm 62 to extend downward from the suspension block 102 and connect to the pendulum bob 60.

In a similar manner, the absorber plate 272 is connected at its upper end to an upper horizontal connection plate 294 which extends substantially along the length of the connection block 232. A cap strip 296 and screws 297 rigidly connect the left end (as shown) of the horizontal connection plate 294 to the connection block 232. The right end (as shown) of the horizontal connection plate 294 is rigidly connected to the upper end of the absorber plate 272 by a cap strip 298 and screws 299.

Two partial-length lower horizontal connection plates 300 and 302 connect the lower end of the absorber plate 272 to the suspension block 104. Cap strips 304 and 306 and screws 307 rigidly connect the left-hand ends (as shown) of the partial-length horizontal connection plates 300 and 302 to the suspension block 104. The right ends (as shown) of the two partial-length horizontal plates 300 and 302 are rigidly connected to the lower end of the absorber plate 272 by cap strips 308 and 310 and screws 311. The space between the two lower partial-length horizontal connection plates 300 and 302 permits the pendulum arm 64 to extend downward from the suspension block 104 and connect to the pendulum bob 60.

As described, the suspension plates 216, 218 and 226, 228 extend downward from the frame pieces 212 and 214 which are connected through the control motors 124A and 124B to the arm extensions 200 and 202 of the support post 40. The downward parallel orientation of the suspension plates 216, 218 and 226, 228 is substantially parallel to the common plane of oscillation of the pendulums as explained in conjunction with FIGS. 2 and 3. The width of the suspension plates 216, 218 and 226, 228 (the width extending parallel to the arm extensions 200 and 202) is sizable enough to resist any deflection within the planes in which those suspension plates extend. Consequently, the suspension plates 216, 218, 226 and 228 transfer substantially all of the aligned mode energy (parallel to the line 78, FIGS. 2 and 3) within the planes of the suspension plates through the frame pieces 212 and 214 and control motors 124A and 124B to the arm extensions 200 and 202 between the pendulum suspension structures 36 and 38. The pendulum suspension structures 36 and 38 transfer the aligned mode energy to the suspension points of the pendulums 32 and 34, to change the oscillating energy of those pendulums. The parallel mechanical connection of the suspension plates, their substantial width, and their parallel orientation with the common plane of oscillation, constitute a preferred example of the aligned mode energy transfer coupling 80 (FIG. 4).

On the other hand, the suspension plates 216, 218 and 226, 228 are thin enough in cross-section and made of sufficiently flexible metal material to permit flexure orthogonally to the planes in which the suspension plates 216, 218 and 226, 228 extend. The energy which causes such orthogonal flexure is the horizontal component of the undesirable perpendicular mode energy (aligned with and represented by the arrows 84, FIGS. 2 and 3). The horizontal component of the undesirable perpendicular mode energy (represented by arrows 84) is transferred through the horizontal connection plates 274, 280, 282 and 294, 300, 302 to the absorber plates 270 and 272, where that undesirable perpendicular mode energy is dissipated and absorbed by those plates, thereby suppressing significant adverse effects on the pendulum. The transfer occurs particularly through the lower connection plates 280, 282 and 300, 302 which occupy a suspended relationship relative to the upper horizontal connection plates 274 and 294. The thin cross-section and sufficiently flexible material of the suspension plates 216, 218 and 226, 228, their relatively easy flexure orthogonally to the planes of those suspension plates, and their parallel orientation with the common plane of oscillation, constitute a preferred example of the perpendicular mode energy absorbing coupling 88 (FIG. 5) which absorbs and dissipates the horizontal component of the undesirable perpendicular mode energy aligned with the arrows 84 (FIGS. 2 and 3).

The horizontal connection plates 274, 280, 282 and 294, 300, 302 are also sufficiently thin in cross-section and made of sufficiently flexible material to permit flexure orthogonally to the planes in which those connection plates extend. Such perpendicular flexure occurs by flexing of the horizontal connection plates 274, 280, 282 and 294, 300, 302. The vertical component of the undesirable perpendicular mode energy in the common plane of oscillation of the pendulums (represented by the arrows 82, FIGS. 2 and 3) is transferred through the suspension plates 216, 218 and 226, 228 and causes the horizontal connection plates 274, 280, 282 and 294, 300, 302 to flex. Flexing of these horizontal connection plates 274, 280, 282 and 294, 300, 302 transfers the vertical component of the undesirable perpendicular mode energy to the absorber plates 270 and 272 where that undesirable perpendicular mode energy is dissipated and absorbed by those plates, thereby suppressing significant adverse effects on the pendulums. The thin cross-section and sufficiently flexible material of the horizontal connection plates 274, 280, 282 and 294, 300, 302, their easy flexure perpendicularly relative to the imaginary line 78 (FIGS. 2 and 3) constitute a preferred example of the perpendicular mode energy absorbing coupling 86 (FIG. 5) which absorbs and dissipates the vertical component of the undesirable perpendicular mode energy aligned with the arrows 82 (FIGS. 2 and 3).

As a result of their substantially identical characteristics, both pendulum suspension structures 36 and 38 transfer the desirable aligned mode energy between the pendulums 32 and 34, and both pendulum suspension structures 36 and 38 absorb undesirable perpendicular mode energy to quickly suppress any adverse effects on the swinging pendulums 32 and 34.

Any torque effect on the gravimeter 30, such as for example might occur upon the movement of the gravimeter 30 within a borehole, could introduce undesirable perpendicular mode energy to adversely affect the oscillation of the pendulums 32 and 34 in the common plane of oscillation. Such torque effects necessarily introduce components of force, energy and motion parallel to at least one of the arrows 82 and 84 (FIGS. 2 and 3) and thus constitutes undesirable perpendicular mode energy. The undesirable perpendicular mode energy associated with such torque effects is absorbed and dissipated by the effects of the perpendicular mode of energy absorbing coupling 86 and 88 (FIG. 5) described above.

The adjustment to the length (L) of each pendulum arm described above in connection with FIGS. 6 and 7 is accomplished by attaching the pendulum length control motor 100 and the bearing block 106 to the suspension blocks 102 and 104, as understood from FIGS. 14-18. In this manner, the suspension blocks 102 and 104 are separated from one another to adjust the effective length (L) of the pendulum arms 52, 54 and 62, 64 as previously described in connection with FIGS. 6 and 7. The slight separation deviates the suspension plates 216, 218 and 226, 228 from a common precise parallel relationship, but that slight deviation does not diminish the generally parallel relationship of the suspension plates 216, 218 and 226, 228, and does not diminish or eliminate the desirable transfer of aligned mode energy from one pendulum 32 to the other pendulum 34 and the absorption and suppression of the undesirable perpendicular energy mode energy from the pendulums 32 and 34.

Both amplitude sensors 120 and 122 are of essentially the same construction and operation. Details concerning both amplitude sensors 120 and 122 are shown and discussed principally in FIGS. 14-19, where the interaction of the pendulum bob 60 with the amplitude sensor 122 is illustrated. The details of the amplitude sensor 120 and its interaction with the pendulum bob 50 are identical to those described in FIG. 19.

A flag 312 is attached to the bottom of the pendulum bob 60. The flag 312 may take the form of a small cylinder or other physical object. The flag 312 attached to the other pendulum bob 50 is identical in size, weight and configuration to that attached to the pendulum bob 60, thereby causing both pendulum bobs to have the same weight and the same of mass (73 and 75, FIGS. 2 and 3). Under such circumstances the flag 312 will partially obscure a cylindrical pathway formed by matching cylindrical holes 314 and 316 formed in brackets 318 and 320 that are attached to the base 42 (FIGS. 14-18). A conventional light source 322 is positioned within the hole 314 of the bracket 318, and a conventional light receiver 324 is positioned within the hole 316 of the bracket 320. Light from the light source 322 traverses a cylindrical path to the light receiver 324. The oscillating movement of the pendulum causes the flag 312 to intercept and block a varying amount of light in the cylindrical light path between the light source 322 and the light receiver 324 when the pendulum bob approaches, moves into and then retreats from its maximum amplitude point (FIGS. 2 and 3).

Figure 19:
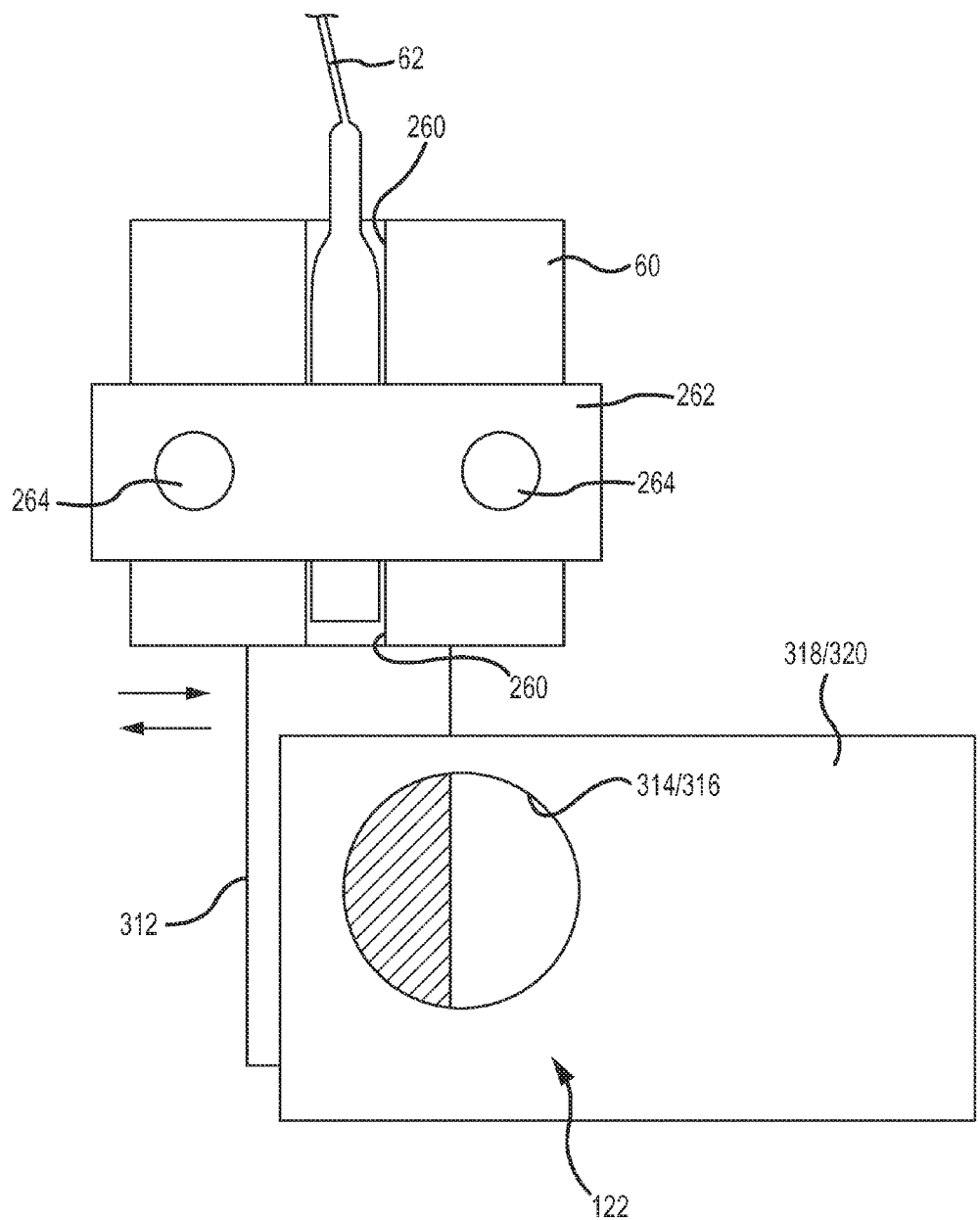
FIG. 19 is an enlarged partial side view of portions of an amplitude sensor and a pendulum of the gravimeter shown in FIGS. 1 and 14-18.

The pendulum bob 60 is shown in FIG. 19 at its predetermined maximum amplitude point at the right end of its arc of oscillation. At the maximum amplitude point, the flag 312 partially blocks the cylindrical light path between the light source 322 and the light receiver 324 (FIGS. 14, 15, 17 and 18). Under these circumstances, the amount or intensity of the light received by the light receiver 324 (FIGS. 14, 15 and 17) represents the maximum amplitude point of oscillation of the pendulum. When the pendulum moves from its maximum amplitude point of oscillation (to the left from the position shown in FIG. 19), more light will be transmitted through the cylindrical light path to the light receiver 324 because the flag 312 does not obscure as much of the light path compared to when the pendulum bob 60 occupyied the maximum amplitude point. If the arc of oscillation of the pendulum bob 60 increases, causing the pendulum bob 62 experience a greater maximum amplitude point compared to its predetermined desired maximum amplitude point, less light will be transmitted because the flag 312 obscures more of the cylindrical light path light. If the arc of oscillation of the pendulum bob 60 decreases, causing the pendulum bob 62 experience a lesser maximum amplitude point compared to its predetermined desired maximum amplitude point, more light will be transmitted because the flag 312 obscures less of the cylindrical light path light.

The amount of light sensed by the light receiver 324 is converted into an amplitude signal (144 or 146, FIGS. 11 and 12). The amplitude signal directly correlates to the maximum amplitude point of the pendulum bob in its arc of oscillation. The amplitude signal changes when the point of maximum amplitude in the arc of oscillation changes. The changes in the amplitude signal are used by the feedback controller 126 (FIG. 11) to regulate the oscillating energy of the pendulum, as previously described.

The ends of each pendulum arms 52, 54, 62 and 64 are rigidly attached to the suspension blocks 102 and 104 and to the pendulum bobs 50 and 60. Accordingly, each pendulum 32 and 34 can oscillate in its arc of oscillation only because each pendulum arm 52, 54 and 62, 64 is formed of resilient material which flexes sufficiently to allow oscillation of the pendulum bobs 50 and 60 in their arcs of oscillation. Such rigid connections at the ends of the pendulum arms are preferred, because a lack of relative movement at the suspension points 56 and 58 and at the connection points 66 and 68 does not consume energy through relative frictional movement.

It is also preferred that the material of the pendulum arms 52, 54 and 62, 64 consume only a minimum amount of energy when it flexes during oscillation of the pendulums. It is further desired that almost all of the energy consumed in flexing the pendulum arms in one direction should be delivered back when the pendulum arms flex in the opposite direction. Quartz (fused silica) has this capability. Constructing the pendulum arms 52, 54, 62 and 64 from quartz has the benefit of allowing rigid connections at the ends of the pendulum arms and consuming very little net energy when flexing. Conserving the oscillatory energy of the pendulum diminishes the rate at which it decays and minimizes the need to add additional energy to maintain and sustain a constant predetermined maximum amplitudes in the arcs of oscillation of the pendulums.

Figure 20:
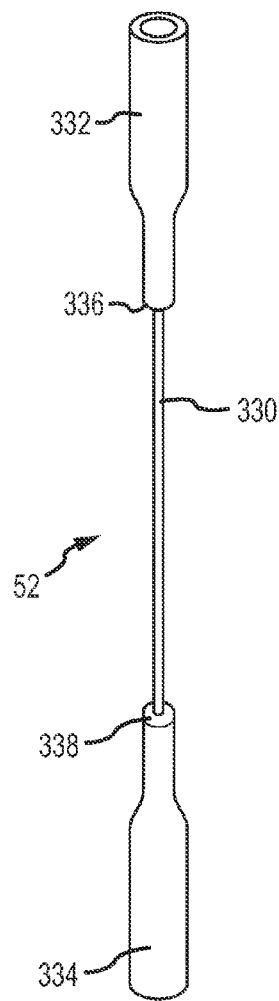
FIG. 20 is a perspective view of a flexure which constitutes a pendulum arm of the gravimeter shown in FIGS. 1 and 14-19.
Figure 21:
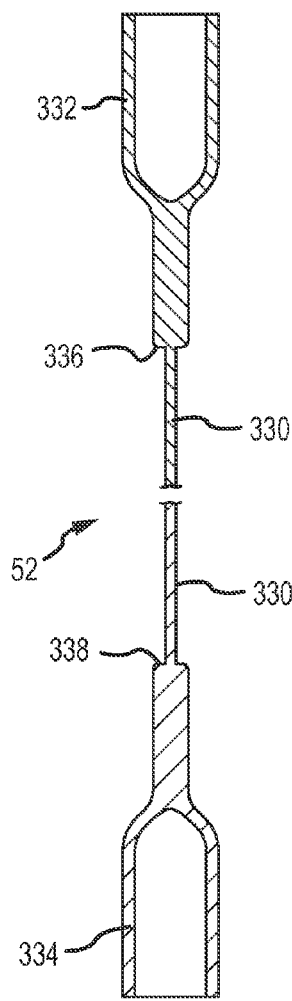
FIG. 21 is an axial section view of the pendulum arm flexure shown in FIG. 20, taken in a plane along the axis of the flexure.

An exemplary pendulum arm 52 formed from quartz is shown in FIGS. 20 and 21. The other pendulum arms 54, 62 and 64 are substantially identical to the pendulum arm 52 shown in FIGS. 20 and 21. The pendulum arm 52 is formed by a long and relatively small and uniform diameter fiber 330. The ends of the fiber 330 are rigidly joined to holders 332 and 334. The holders are preferably formed from the same material as the fiber 330. The holders 332 and 334 are joined to the fiber 332 at a precise separation distance between rigid inner ends 336 and 338 of the holders 332. Separating the holders 332 and 334 at a precise distance along the length of the fiber 330 results in a precise effective length of the flexible pendulum arm 52. The fiber 330 flexes in a uniform manner relative to the rigid inner ends 336 and 338 of the holders 332 and 334. Uniform flex characteristics are important in establishing uniform and consistent flex characteristics of each pendulum arm, thereby causing both pendulums 32 and 34 to oscillate with similar characteristics.

A thin conductive layer of electrically conductive material, such as gold palladium (not shown) is applied to the exterior of each pendulum arm. The conductive layer electrically connects the pendulum arm to the pendulum suspension structures 36 and 38 which are connected through the post 40 to the base 42 (FIG. 1). In essence, the coating electrically connects the pendulum arms to the same common reference potential as the surrounding components of the gravimeter 30, thereby draining any electrostatic charge that might otherwise accumulate on the pendulum arms during use. An accumulation of static charge on the pendulum arm will electrostatically attract and repel the pendulum arm from adjoining structures and thereby adversely influence the oscillation characteristics of the pendulum. Adverse influences on the oscillation of the pendulum create inaccuracies in the measuring the gravity value.

Figure 22:
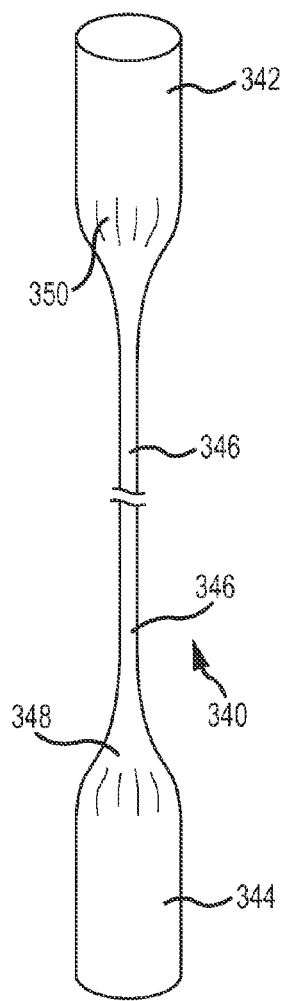
FIG. 22 is a perspective view of a prior art pendulum arm flexure.

A prior art quartz pendulum arm 340 is shown in FIG. 22. The pendulum arm 340 is made by heating the center portion of a cylindrical rod of quartz material until it is viscous enough to flow. End portions 342 and 344 of the cylindrical rod are not heated. When the center portion is sufficiently viscous to allow the quartz material to flow, the end portions 342 and 344 are pulled apart and the molten center portion is stretched into a longer and smaller diameter fiber 346 which connects through transitional portions 348 and 350 to the end portions 342 and 344, respectively.

The difficulty in forming the prior art pendulum arm 340 is that the transitional portions 348 and 350 from the larger diameter end portions 342 and 344 to the smaller diameter center fiber 346 are variable and not uniform in their cross-sectional configurations. Consequently, the flex characteristics of the pendulum arm 340 are variable, because some portion of the transitions 348 and 350 flex along with the center fiber 346, thereby causing indeterminate and variable flex and length characteristics of the pendulum arms. It becomes almost impossible to create two pendulum arms which have the same length and flexure characteristics using this prior art technique. Without having the same flexure and length characteristics, it is very difficult or impossible to achieve satisfactory oscillation of a single pendulum supported by two different pendulum arms or to achieve satisfactory coordinated performance from two pendulums in a single device such as the gravimeter 30. Two different pendulum arms have different natural resonant frequencies of oscillation, and each responds differently to the transfer and regulation of energy. In contrast, the distinct holders 332 and 334 (FIGS. 20 and 21) and the precise control over the length of the fiber 330 between the inner ends 336 and 338 of the holders 332 and 334 makes it considerably easier to obtain uniform flexure and length characteristics in multiple pendulum arms.

More details concerning the structure, construction and functional characteristics of the pendulum arms 52, 54 and 62, 64, as well as disadvantageous aspects of the prior art pendulum arm 340, are described in the above cross-referenced US patent application.

Although not shown, the gravimeter 30, shown in FIGS. 1 and 14, is incorporated in a sealed housing or vessel (not shown) connected to the base 42 (FIGS. 1 and 14), and that sealed vessel is evacuated to the greatest extent possible to eliminate frictional energy losses between the oscillating pendulums 32 and 34 and any residual gas within the evacuated vessel. Furthermore, a heater and a temperature measurement and control system (neither shown) are also included within the evacuated vessel. The heater and temperature control system maintain a constant temperature of the components, thereby preventing temperature-induced changes in the length of the pendulum arms 52, 54 and 62, 64 or in the functionality of the components.

For the gravimeter 30 to be inserted into relatively small diameter borehole 46 (FIG. 1), the diameter of the base 42 (FIGS. 1 and 14) and the attached sealed vessel (not shown) must be less than the diameter of the borehole. At the present time, the smallest borehole in which gravity measurements are taken has a diameter of about 2⅜ inches, although gravity measurements are also frequently made in larger boreholes. An exemplary size of a working gravimeter in accordance with the present invention has a diameter of slightly greater than 4½ inches, but the scale of this device is reducible. The length of the fibers 330 of the pendulum arms is about 6 mm.

As has as been described above, the maximum amplitude points in the arcs of oscillation of the pendulums are maintained constant, which allows a direct calculation of the gravity value by applying only a single previously calculated mathematical correction factor to the theoretical value of gravity, unlike prior pendulums which constantly require recalculation of the correction factors depending upon the decreasing amplitudes of the decaying arcs of oscillation of those pendulums. The constant amplitude point within the arc of oscillation of the pendulum makes it easier and more accurate to determine the period (T) and/or frequency (f) of pendulum oscillation with accuracy, leading to increased accuracy in the measurement of gravity. Energy is added or subtracted to sustain the maximum amplitude points in the arcs of oscillation in a manner which does not adversely, significantly and prolongedly influence the oscillating characteristics of the pendulum. The adverse influences from energy imparted to the pendulums in undesired modes is quickly suppressed, while the desired influences from oscillating energy in the aligned mode are readily transferred between the pendulums. The adverse effects of seismic noise are essentially eliminated by establishing separate sine wave curves for each of the pendulums and then averaging those two sine wave curves. Many other improvements and benefits will become apparent upon gaining a full appreciation of the present invention.

The significance of the above described improvements and many of its advantages and benefits have been described with a degree of particularity. The detail in describing these preferred examples of implementing the invention is not necessarily intended to limit the scope of the invention. The scope of the invention is defined by the following claims.

The invention claimed:

1. A gravimeter for measuring a value of gravity, comprising:
    a first pendulum connected at a first suspension point to oscillate about the first suspension point in a first arc of oscillation under the influence of gravity and oscillation energy applied to the first pendulum;
    a first sensor associated with the first pendulum to sense a characteristic of oscillation of the first pendulum in the first arc of oscillation;
    a second pendulum connected at a second suspension point to oscillate about the second suspension point in a second arc of oscillation under the influence of gravity and oscillation energy applied to the second pendulum;
    a second sensor associated with the second pendulum to sense a characteristic of oscillation of the second pendulum in the second arc of oscillation; and wherein:
    the first and second suspension points are separated from one another;
    the first and second pendulums oscillate in a common plane at a relative 180° phase difference with respect to one another; and further comprising:
    a transfer coupling connected to the first and second suspension points and operative to transfer aligned mode energy between the first and second suspension points, the aligned mode energy constituting a component of energy which is aligned directly between the first and second suspension points and which is effective at the first and second suspension points.

2. A gravimeter as defined in claim 1, wherein:
    the aligned mode energy includes a component of energy related to any difference in oscillation energy of the first and second pendulums; and
    the transfer coupling transfers any difference in oscillation energy of the first and second pendulums as aligned mode energy between the first and second pendulums.

3. A gravimeter as defined in claim 2, further comprising:
    an absorbing coupling connected to the first and second suspension points, the absorbing coupling dissipating perpendicular mode energy from the first and second suspension points, the perpendicular mode energy constituting any component of energy which is effective perpendicular to the aligned mode energy transferred by the transfer coupling between the first and second suspension points.

4. A gravimeter as defined in claim 2, wherein:
    the transfer coupling transfers the aligned mode energy between the first and second suspension points until the first and second pendulums have approximately equal oscillation energy.

5. A gravimeter as defined in claim 4, wherein:
    the characteristic of oscillation of each pendulum sensed by each sensor includes information which correlates to one of the arc of oscillation or a maximum amplitude point of the pendulum; and
    the information correlating to the arc of oscillation or the maximum amplitude point is used to determine a correction factor applied in determining the value of gravity.

6. A gravimeter as defined in claim 4, further comprising:
an energy control motor connected to move the suspension point of one of the first or second pendulums; and
an energy feedback controller connected to the sensor associated with the one pendulum and to the energy control motor to actuate the energy control motor to move the one suspension point of the one pendulum during oscillation and thereby change the amount of oscillation energy of the one pendulum to establish and maintain a substantially constant arc of oscillation of the one pendulum.

7. A gravimeter as defined in claim 6, wherein:
the energy control motor moves the one suspension point in the direction of movement of the one pendulum to add oscillation energy to the one pendulum and moves the one suspension point in a direction opposite of movement of the one pendulum to subtract energy from the one pendulum.

8. A gravimeter as defined in claim 6, wherein:
the energy control motor moves the one suspension point perpendicularly relative to a vertical reference through the one suspension point and which bisects the angle of oscillation to add or subtract oscillation energy.

9. A gravimeter as defined in claim 6, wherein:
each first and second pendulum comprises an elongated arm and a bob, one end of the arm is connected to the bob and the other end of the arm is connected to the suspension point of the pendulum, the arm oscillating relative to the suspension point during oscillation of the pendulum;
the lengths of the arms of the first and second pendulums are substantially equal;
each pendulum has a natural resonant frequency;
each pendulum has a resonant characteristic which is characterized by a Q;
the natural resonant frequencies of both pendulums are substantially equal; and
the Q's of each pendulum are substantially equal.

10. A gravimeter as defined in claim 6, wherein:
the energy control motor and the energy feedback controller constitute a first energy control motor and a first energy feedback controller, respectively;
the first energy control motor is operative to move the first suspension point during oscillation of the first pendulum; and further comprising:
a second energy control motor connected to move the second suspension point; and
a second energy feedback controller connected to the second sensor and to the second energy control motor to actuate the second energy control motor to move the second suspension point of the second pendulum during oscillation and thereby change the amount of oscillation energy of the second pendulum to establish and maintain a substantially constant arc of oscillation of the second pendulum.

11. A gravimeter as defined in claim 10, wherein:
the transfer coupling transfers a component of aligned mode energy imparted to each suspension point by actuation of the connected energy control motors until both the first and second pendulums achieve substantially equal oscillation energy and substantially equal and constant arcs of oscillation.

12. A gravimeter as defined in claim 11, wherein:
the characteristic of oscillation of each pendulum sensed by each sensor includes information which correlates to one of the arc of oscillation or a maximum amplitude point of the pendulum; and in combination with:
a computational device which receives the information from the first and second sensors; and wherein:
the computational device utilizes information of the sensed characteristics from the first and second sensors to establish a separate representation of the oscillation of each of the first and second pendulums; and
the computational device averages the separate representations of the oscillation of the first and second pendulums when determining the value of gravity.

13. A gravimeter as defined in claim 6, further comprising:
an absorbing coupling connected to the first and second suspension points, the absorbing coupling dissipating perpendicular mode energy from the first and second suspension points, the perpendicular mode energy constituting any component of energy which is effective perpendicular to the aligned mode energy transferred by the transfer coupling between the first and second suspension points.

14. A gravimeter as defined in claim 13, wherein the transfer coupling and the absorbing coupling collectively comprise:
at least one plate which is rigid in a plane in which the plate extends and which is flexible orthogonally to the plane; and
the plate extends substantially within the common plane.

15. A gravimeter as defined in claim 13, wherein the transfer coupling and the absorbing coupling collectively further comprise:
first and second plates;
a base;
a post extending upward from the base;
first and second energy absorbers, the first energy absorber connected to the first plate by connectors at upper and lower ends of the first plate, the second energy absorber connected to the second plate by connectors at upper and lower ends of the second plate, the first and second energy absorbers respectively extending in generally parallel and separated relationships relative to the first and second plates; and wherein:
the first suspension point of the first pendulum is located at the lower end of the first plate;
the second suspension point of the second pendulum is located at the lower end of the second plate;
the upper end of each plate is operatively connected to the post;
the upper end of one of the first and second plates is operatively connected by the energy control motor to the post;
the planes of the first and second plates extend substantially parallel to the common plane of oscillation of the first and second pendulums; and
the connectors transfer perpendicular mode energy to the energy absorbers.

16. A gravimeter as defined in claim 15, wherein:
each first and second pendulum comprises a pair of elongated arms and a bob, one end of each arm is connected to the bob, the other end of one arm is connected at the lower end of the first plate, and the other end of the other arm is connected at the lower end of the second plate.

17. A gravimeter as defined in claim 16, further comprising:
a length controller operatively connected between the lower ends of the first and second plates, the length controller is operative to separate the other ends of the arms by a preselected amount to operatively establish the effective length of the first and second pendulums.

18. A gravimeter as defined in claim 2, which has a diameter of approximately 4.5 inches to permit insertion into a borehole having a slightly larger diameter to measure gravity therein.

19. A gravimeter for measuring a value of gravity, comprising:
a pendulum connected at a suspension point to oscillate about the suspension point in an arc of oscillation under the influence of gravity and oscillation energy applied to the pendulum;
a sensor associated with the pendulum to sense a characteristic of oscillation of the pendulum in the arc of oscillation;
an energy control motor connected to move the suspension point; and
an energy feedback controller connected to the sensor and to the energy control motor to actuate the energy control motor to move the suspension point during oscillation of the pendulum and thereby change the amount of oscillation energy of the pendulum to establish and maintain a substantially constant arc of oscillation of the pendulum; and wherein:
the sensed characteristic includes information sufficient to determine the value of gravity based on the substantially constant arc of oscillation of the pendulum.

20. A gravimeter as defined in claim 19, wherein:
the energy control motor moves the suspension point in the direction of movement of the pendulum to add oscillation energy to the pendulum and moves the suspension point in an opposite direction of movement of the pendulum to subtract oscillation energy from the pendulum.

21. A gravimeter as defined in claim 20, wherein:
the energy control motor moves the suspension point perpendicularly relative to a vertical reference through the suspension point to add or subtract the oscillation energy.

22. A gravimeter as defined in claim 19, wherein:
the characteristic sensed by the sensor includes information which correlates to the arc of oscillation; and
the information correlating to the arc of oscillation is used to determine a correction factor that is used to determine the value of gravity.

23. A gravimeter as defined in claim 19, wherein:
the pendulum and the suspension point constitute a first pendulum and a first suspension point, respectively; and further comprising:
a second pendulum connected at a second suspension point to oscillate about the second suspension point in an arc of oscillation under the influence of gravity and oscillation energy of the second pendulum; and wherein:
the first and second suspension points are separated from one another;
the first and second pendulums oscillate at a relative 180° phase difference with respect to one another in a common plane; and further comprising:
a transfer coupling connected to the first and second suspension points and operative to transfer aligned mode energy between the first and second suspension points, the aligned mode energy constituting a component of energy which is aligned directly between the first and second suspension points and is effective at the first and second suspension points.

24. A gravimeter as defined in claim 23, wherein:
the sensor constitutes a first sensor; and further comprising:
a second sensor associated with the second pendulum to sense a characteristic of the arc of oscillation of the second pendulum; and wherein:
the aligned mode energy constitutes a component of energy related to any difference in the oscillation energy of the first and second pendulums; and
the transfer coupling transfers the component of aligned mode energy related to any difference in the oscillation energy between the first and second pendulums until the first and second pendulums achieve and maintain substantially constant arcs of oscillation.

25. A gravimeter as defined in claim 23, further comprising:
an absorbing coupling connected to the first and second suspension points, the absorbing coupling substantially dissipating perpendicular mode energy, the perpendicular mode energy constituting components of energy which are effective perpendicular to the aligned mode energy transferred by the transfer coupling between the first and second suspension points.

26. A gravimeter as defined in claim 25, wherein:
each first and second pendulum comprises an arm and a bob, one end of the arm is connected to the bob and the other end of the arm is connected to the suspension point of the pendulum, the arm moving relative to the suspension point during oscillation of the pendulum;
the lengths of the arms of the first and second pendulums are substantially equal;
each pendulum has a natural resonant frequency;
each pendulum has a resonant characteristic characterized by a Q;
the natural resonant frequencies of both pendulums are substantially equal; and
the Q's of each pendulum are substantially equal.

27. A method of measuring a value of gravity, comprising:
oscillating a first pendulum about a first suspension point in a first arc of oscillation under the influence of gravity and oscillation energy applied to the first pendulum;
oscillating a second pendulum about a second suspension point in a second arc of oscillation under the influence of gravity and oscillation energy applied to the second pendulum, the second suspension point being separated from the first suspension point;
oscillating the first and second pendulums at a relative 180° phase difference with respect to one another in a common plane;
coupling the first and second suspension points to transfer aligned mode energy between the first and second suspension points, the aligned mode energy constituting a component of energy which is aligned directly between the first and second suspension points and which is effective at the first and second suspension points; and
determining the value of gravity from a characteristic of oscillation of one of the first or second pendulums.

28. A method as defined in claim 27, further comprising:
including in the aligned mode energy a component of energy related to any difference in oscillation energy of the first and second pendulums in the common plane.

29. A method as defined in claim 28, further comprising:
transferring aligned mode energy between the first and second suspension points until the first and second pendulums have approximately equal oscillation energy.

30. A method as defined in claim 27, further comprising:
moving the suspension point of one of the first or second pendulums during oscillation to thereby change the amount of oscillation energy of the one pendulum.

31. A method as defined in claim 27, further comprising:
establishing separate representations of the oscillation of each of the first and second pendulums; and
averaging the separate representations to determine the value of gravity.

32. A method as defined in claim 27, further comprising:
dissipating perpendicular mode energy from the first and second suspension points, the perpendicular mode energy constituting any component of energy which is effective perpendicular to the aligned mode energy transferred between the first and second suspension points.

33. A method of measuring a value of gravity, comprising:
oscillating a pendulum about a suspension point in an arc of oscillation under the influence of gravity and oscillation energy applied to the pendulum;
sensing a characteristic of oscillation of the pendulum in the arc of oscillation;
moving the suspension point during oscillation of the pendulum in relation to the sensed characteristic to change the amount of oscillation energy of the pendulum to establish and maintain a substantially constant arc of oscillation of the pendulum; and
determining the value of gravity based on the substantially constant arc of oscillation of the pendulum.

34. A method as defined in claim 33, further comprising:
moving the suspension point in the direction of pendulum movement to add oscillation energy to the pendulum and moving the suspension point in an opposite direction of pendulum movement to subtract oscillation energy from the pendulum.

35. A method as defined in claim 33, further comprising:
determining a correction factor used in determining the value of gravity from the constant arc of oscillation.

\* \* \* \* \*